(12) United States Patent
Ishikawa et al.

(10) Patent No.: US 11,221,040 B2
(45) Date of Patent: Jan. 11, 2022

(54) TAPERED ROLLER BEARING

(71) Applicant: NTN CORPORATION, Osaka (JP)

(72) Inventors: Takanori Ishikawa, Iwata (JP);
Takashi Kawai, Iwata (JP); Tomoki Matsushita, Iwata (JP); Nozomi Isobe, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/650,805

(22) PCT Filed: Sep. 26, 2018

(86) PCT No.: PCT/JP2018/035728
§ 371 (c)(1),
(2) Date: Mar. 25, 2020

(87) PCT Pub. No.: WO2019/065753
PCT Pub. Date: Apr. 4, 2019

(65) Prior Publication Data
US 2020/0248744 A1    Aug. 6, 2020

(30) Foreign Application Priority Data

Sep. 28, 2017   (JP) .............................. JP2017-188703
Sep. 28, 2017   (JP) .............................. JP2017-188704
(Continued)

(51) Int. Cl.
*F16C 19/36*     (2006.01)
*F16C 33/58*     (2006.01)
(Continued)

(52) U.S. Cl.
CPC .......... *F16C 19/364* (2013.01); *F16C 33/585* (2013.01); *C21D 9/40* (2013.01);
(Continued)

(58) Field of Classification Search
CPC .... F16C 19/364; F16C 33/366; F16C 33/585; F16C 2204/60; F16C 2240/50;
(Continued)

(56) References Cited

U.S. PATENT DOCUMENTS 6,328,477 B1    12/2001   Tsujimoto et al.
8,858,088 B2 *  10/2014   Fujiwara ................. F16C 33/36
                                                 384/568

(Continued)

FOREIGN PATENT DOCUMENTS

DE        10203113 A1    8/2002
DE   102016202108 A1 *   8/2017   ............... H02K 5/16
(Continued)

OTHER PUBLICATIONS

International Search Report issued in corresponding International Patent Application No. PCT/JP2018/035728, dated Dec. 18, 2018, with English translation.

(Continued)

*Primary Examiner* — Marcus Charles
(74) *Attorney, Agent, or Firm* — McDermott Will & Emery LLP

(57) ABSTRACT

A difference between a maximum value and a minimum value of arithmetic mean roughness Ra of an annular surface region in contact with a larger flange surface, in a larger end face of the tapered roller, is not greater than 0.02 μm. A value of a ratio $R/R_{BASE}$ is not smaller than 0.75 and not greater than 0.87 where R represents a set radius of curvature of the larger end face of the tapered roller and $R_{BASE}$ represents a distance from a point which is an apex of a cone angle of the tapered roller to the larger flange surface of the inner ring. A ratio $R_{process}/R$ is not lower than 0.5 where $R_{process}$ (Continued)

represents an actual radius of curvature after grinding of the larger end face of the tapered roller and R represents a set radius of curvature.

7 Claims, 21 Drawing Sheets

(30) Foreign Application Priority Data

Sep. 18, 2018 (JP) .............................. JP2018-174092
Sep. 18, 2018 (JP) .............................. JP2018-174093

(51) Int. Cl.
    *F16C 33/26*     (2006.01)
    *C21D 9/40*     (2006.01)
    *F16C 33/36*     (2006.01)

(52) U.S. Cl.
    CPC ........ *F16C 33/366* (2013.01); *F16C 2240/50* (2013.01); *F16C 2240/54* (2013.01); *F16C 2240/70* (2013.01); *F16C 2361/61* (2013.01)

(58) Field of Classification Search
    CPC .............. F16C 2240/54; F16C 2240/70; F16C 2361/61; C21D 9/40; C23C 8/54
    USPC ..... 384/564, 565, 568, 569, 571, 625; 703/1
    See application file for complete search history.

(56) References Cited

U.S. PATENT DOCUMENTS

| | | |
|---|---|---|
| 2002/0044707 A1 | 4/2002 | Hanai et al. |
| 2002/0102041 A1 | 8/2002 | Matsuyama et al. |
| 2009/0324155 A1 | 12/2009 | Okamoto et al. |
| 2010/0002975 A1 | 1/2010 | Ueno |
| 2012/0033909 A1 | 2/2012 | Fujiwara |
| 2013/0170780 A1 | 7/2013 | Saito et al. |
| 2020/0056655 A1 | 2/2020 | Matsushita et al. |

FOREIGN PATENT DOCUMENTS

| | | | | |
|---|---|---|---|---|
| EP | 2211067 A1 | * | 7/2010 | ........... C04B 35/597 |
| EP | 2423523 A1 | | 2/2012 | |
| EP | 2458237 A1 | | 5/2012 | |
| JP | H11294460 A | * | 10/1999 | ......... F16C 33/4647 |
| JP | 2000-170774 A | | 6/2000 | |
| JP | 2002-122146 A | | 4/2002 | |
| JP | 2002-221223 A | | 8/2002 | |
| JP | 2006-112559 A | | 4/2006 | |
| JP | 2006-200627 A | | 8/2006 | |
| JP | 2008-121706 A | | 5/2008 | |
| JP | 2008121706 A | * | 5/2008 | ............. F16C 33/36 |
| JP | 2011-196543 A | | 10/2011 | |
| JP | 2014077481 A | * | 5/2014 | |
| JP | 2014238120 A | * | 12/2014 | |
| JP | 2014238153 A | * | 12/2014 | ............. C22C 38/18 |
| JP | 2018-136027 A | | 8/2018 | |
| WO | 2010/122955 A1 | | 10/2010 | |
| WO | WO-2014061699 A1 | * | 4/2014 | ............. F16C 33/32 |
| WO | WO-2014199898 A1 | * | 12/2014 | ............. C22C 38/40 |

OTHER PUBLICATIONS

Extended European Search Report issued In corresponding European Patent Application No. 18861767.4, dated Jun. 9, 2021.

* cited by examiner

POSITION IN AXIAL DIRECTION mm

TAPERED ROLLER BEARING

CROSS-REFERENCE OF RELATED APPLICATIONS

This application is the U.S. National Phase under 35 U.S.C. § 371 of International Patent Application No. PCT/JP2018/035728, filed on Sep. 26, 2018, which in turn claims the benefit of Japanese Patent Application No. 2017-188703, filed on Sep. 28, 2017; Japanese Patent Application No. 2017-188704, filed Sep. 28, 2017; Japanese Patent Application No. 2018-174092, filed Sep. 18, 2018; and, Japanese Patent Application No. 2018-174093, filed Sep. 18, 2018, the entire disclosures of which Applications are incorporated by reference herein.

TECHNICAL FIELD

The present invention relates to a tapered roller bearing.

BACKGROUND ART

A tapered roller bearing has conventionally been known as one type of a bearing. The tapered roller bearing is applied, for example, to a mechanical apparatus such as an automobile. The tapered roller bearing can receive certain axial load as a larger end face of a tapered roller and a larger flange surface of an inner ring are in contact with each other during use. Contact between the larger end face of the tapered roller and the larger flange surface of the inner ring described above, however, is not rolling contact but sliding contact. Therefore, when a lubrication environment in a portion of contact between the larger end face of the tapered roller and the larger flange surface of the inner ring is insufficient, heat is generated in the portion of contact and there is a concern about abrupt increase in temperature.

In order to solve the above-described problem, torque loss and heat generation due to friction in the portion of contact between the larger end face of the tapered roller and the larger flange surface of the inner ring should be lessened and oil film formability in the portion of contact should be improved.

For example, Japanese Patent Laying-Open No. 2000-170774 (which is also called PTL 1 below) has proposed setting a ratio $R/R_{BASE}$ within a range from 0.75 to 0.87 with R representing a radius of curvature of the larger end face of the tapered roller and $R_{BASE}$ representing a distance from an apex of a cone angle of the tapered roller to the larger flange surface (a portion of contact with the tapered roller) of the inner ring. Oil film formability in the portion of contact between the larger end face of the tapered roller and the larger flange surface of the inner ring is thus improved.

CITATION LIST

Patent Literature

PTL 1: Japanese Patent Laying-Open No. 2000-170774

SUMMARY OF INVENTION

Technical Problem

PTL 1, however, does not define an allowable range of an actual radius of curvature after working of the larger end face of the tapered roller. Therefore, even though a value of $R/R_{BASE}$ is set within the range from 0.75 to 0.87, skew larger than expected may be induced with decrease in actual radius of curvature.

When skew occurs, tangential force generated between the larger end face of the tapered roller and the larger flange surface of the inner ring increases, which leads to increase in friction torque and generation of heat. When skew further increases, the larger end face of the tapered roller is in edge contact, which leads to metal-to-metal contact between the tapered roller and the inner ring and locking of the bearing due to heat generation. There is thus also a concern about insufficient seizure resistance.

From a point of view of improvement in reliability and performance of a mechanical apparatus to which the tapered roller bearing described above is applied, further longer lifetime and improvement in durability of the tapered roller bearing have also been demanded.

The present invention was made to solve the problems as described above and an object of the present invention is to provide a tapered roller bearing that is excellent in seizure resistance and has long lifetime and high durability.

Solution to Problem

A tapered roller bearing according to the present disclosure includes an outer ring, an inner ring, and a plurality of tapered rollers. The outer ring includes an outer-ring raceway surface around an inner circumferential surface thereof. The inner ring includes an inner-ring raceway surface around an outer circumferential surface thereof and a larger flange surface arranged on a larger diameter side relative to the inner-ring raceway surface, and is arranged on an inner side relative to the outer ring. The plurality of tapered rollers each include a rolling surface in contact with the outer-ring raceway surface and the inner-ring raceway surface and a larger end face in contact with the larger flange surface. The plurality of tapered rollers are disposed between the outer-ring raceway surface and the inner-ring raceway surface. At least any one of the outer ring, the inner ring, and the plurality of tapered rollers includes a nitrogen enriched layer formed on a surface layer of the outer-ring raceway surface, the inner-ring raceway surface, or the rolling surface. A distance from an outermost surface of the surface layer to a bottom of the nitrogen enriched layer is not shorter than 0.2 mm. A nitrogen concentration in the nitrogen enriched layer is not lower than 0.1 mass % at a position of depth of 0.05 mm from the outermost surface. A difference between a maximum value and a minimum value of arithmetic mean roughness Ra of an annular surface region in contact with the larger flange surface, in the larger end face of the tapered roller, is not greater than 0.02 m. A value of a ratio $R/R_{BASE}$ is not smaller than 0.75 and not greater than 0.87, where R represents a set radius of curvature of the larger end face of the tapered roller and $R_{BASE}$ represents a distance from an apex of a cone angle of the tapered roller to the larger flange surface of the inner ring. A ratio $R_{process}/R$ is not lower than 0.5, where $R_{process}$ represents an actual radius of curvature after grinding of the larger end face of the tapered roller and R represents the set radius of curvature.

Advantageous Effects of Invention

According to the above, a tapered roller bearing that is excellent in seizure resistance and has long lifetime and high durability is obtained.

DESCRIPTION OF EMBODIMENTS

Figure 1:
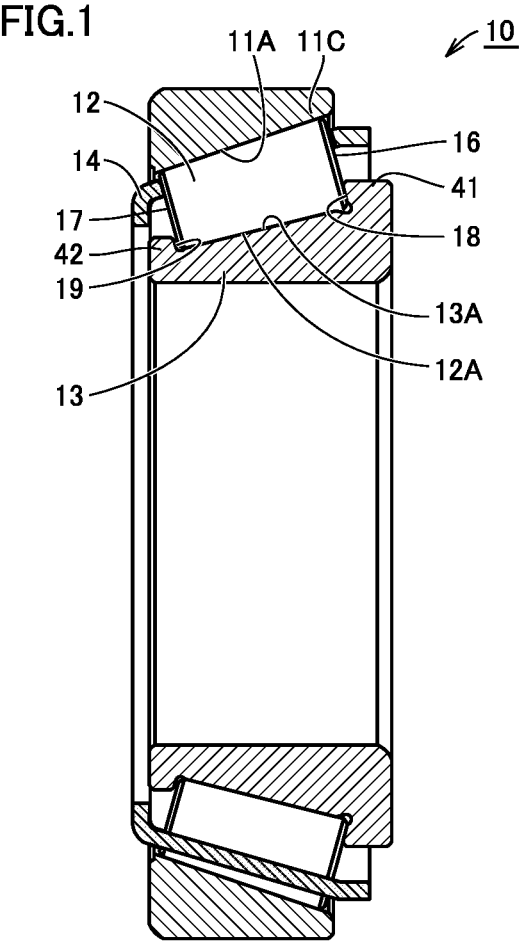
FIG. 1 is a schematic cross-sectional view showing a tapered roller bearing according to a first embodiment.

An embodiment of the present invention will be described below with reference to the drawings. The same or corresponding elements in the drawings below have the same reference characters allotted and description thereof will not be repeated.

First Embodiment

<Construction of Tapered Roller Bearing>

Figure 2:
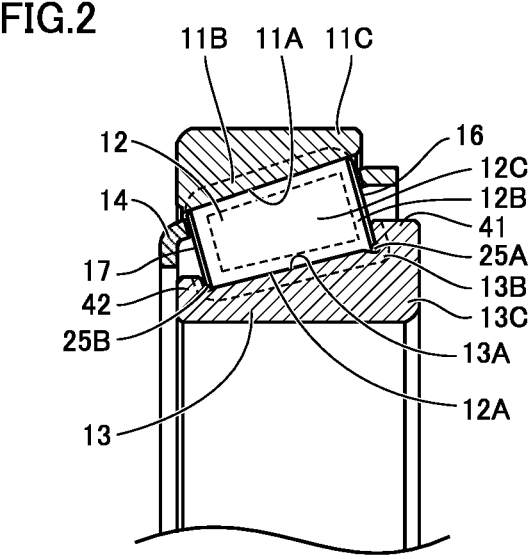
FIG. 2 is a partial schematic cross-sectional view for illustrating a nitrogen enriched layer in the tapered roller bearing according to the first embodiment.
Figure 3:
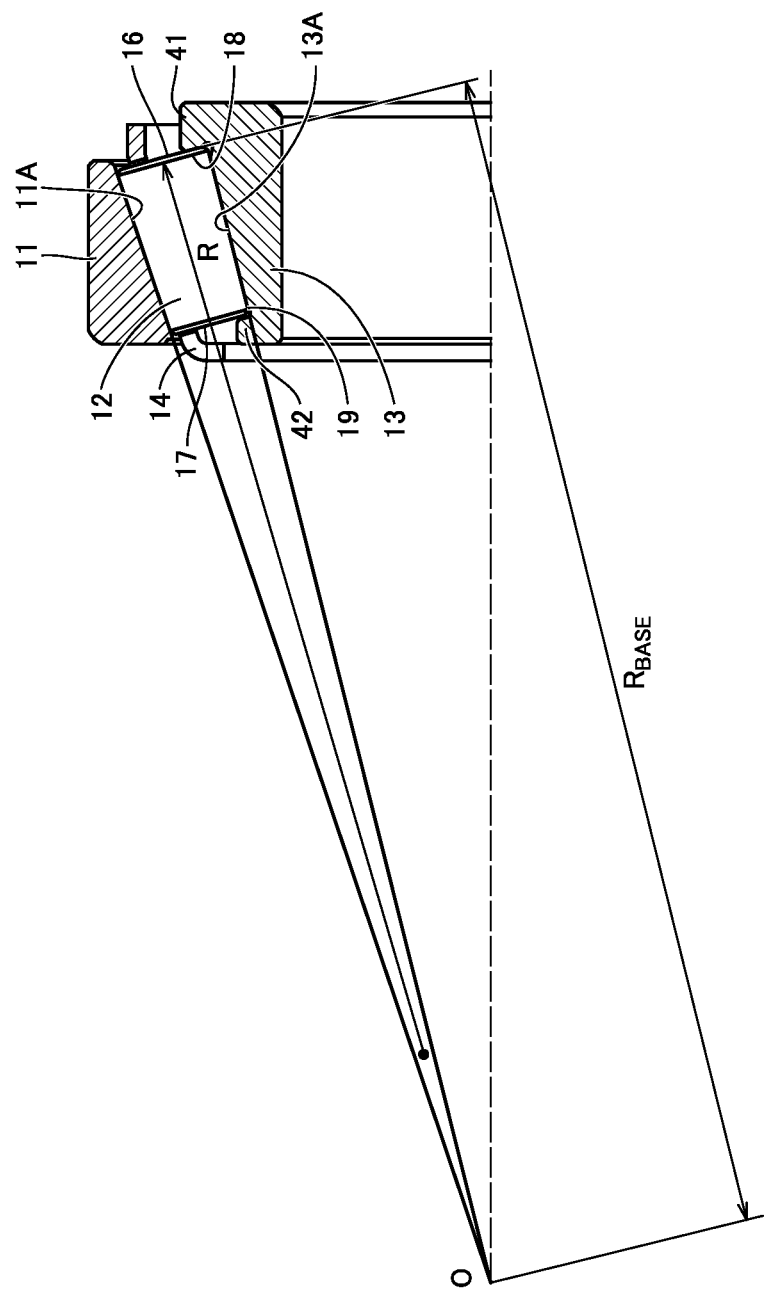
FIG. 3 is a schematic cross-sectional view showing design specifications of the tapered roller bearing according to the first embodiment.
Figure 4:
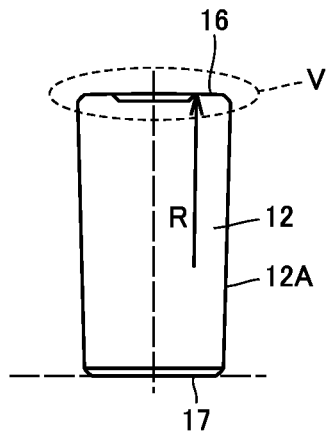
FIG. 4 is a schematic cross-sectional view for illustrating a reference radius of curvature of a roller in the tapered roller bearing according to the first embodiment.
Figure 5:
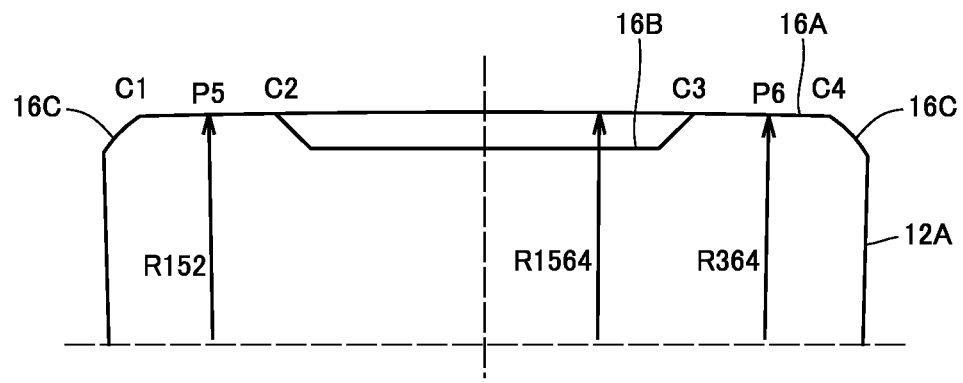
FIG. 5 is a partial schematic cross-sectional view showing a region V shown in FIG. 4.
Figure 6:
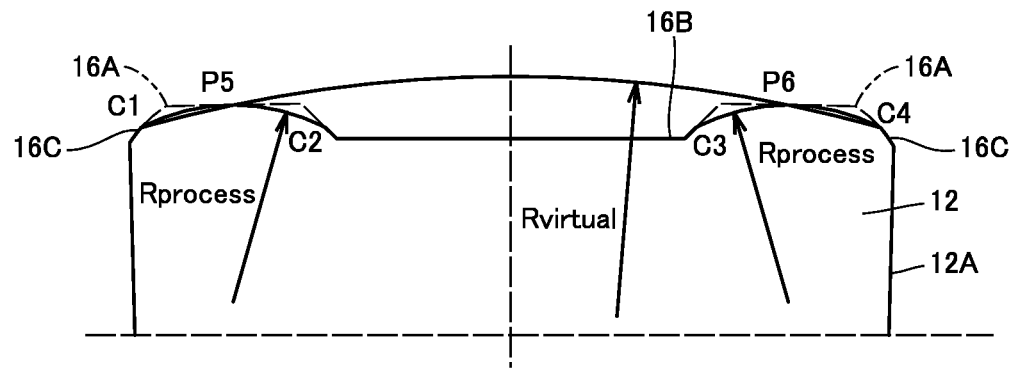
FIG. 6 is a schematic cross-sectional view for illustrating an actual radius of curvature of the roller in the tapered roller bearing according to the first embodiment.
Figure 7:
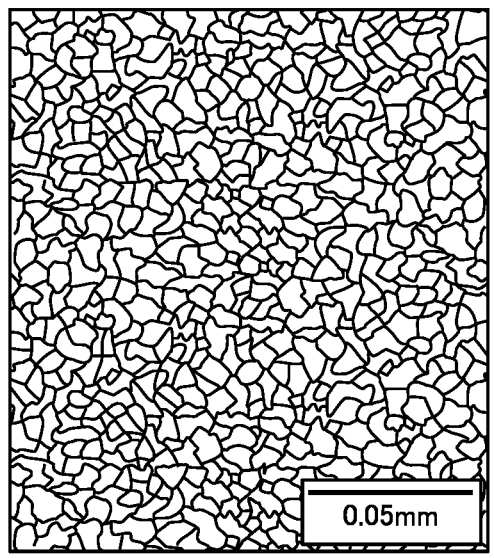
FIG. 7 illustrates a prior austenite crystal grain boundary of a bearing component according to the first embodiment.

FIG. 1 is a schematic cross-sectional view showing a tapered roller bearing according to a first embodiment of the present invention. FIG. 2 is a partial schematic cross-sectional view of the tapered roller bearing shown in FIG. 1. FIG. 3 is a schematic cross-sectional view showing design specifications of the tapered roller bearing shown in FIGS. 1 and 2. FIG. 4 is a schematic cross-sectional view for illustrating a reference radius of curvature of a roller in the tapered roller bearing according to the first embodiment of the present invention. FIG. 5 is a partial schematic cross-sectional view showing a region V shown in FIG. 4. FIG. 6 is a schematic cross-sectional view for illustrating an actual radius of curvature of the roller in the tapered roller bearing according to the first embodiment of the present invention. FIG. 7 is a schematic plan view showing a larger end face of the tapered roller of the tapered roller bearing according to the first embodiment of the present invention. The tapered roller bearing according to the present first embodiment will be described with reference to FIGS. 1 to 7.

A tapered roller bearing 10 shown in FIG. 1 mainly includes an outer ring 11, an inner ring 13, a plurality of tapered rollers 12, and a cage 14. Outer ring 11 has an annular shape, and includes an outer-ring raceway surface 11A around its inner circumferential surface. Inner ring 13 has an annular shape, and includes an inner-ring raceway surface 13A around its outer circumferential surface. Inner ring 13 is arranged on an inner circumferential side of outer ring 11 such that inner-ring raceway surface 13A faces outer-ring raceway surface 11A. In the description below, a direction along a central axis of tapered roller bearing 10 is referred to as an "axial direction," a direction orthogonal to the central axis is referred to as a "radial direction," and a direction along a circular arc around the central axis is referred to as a "circumferential direction."

Tapered rollers 12 are arranged on the inner circumferential surface of outer ring 11. Tapered roller 12 has a roller rolling surface 12A and comes in contact with inner-ring raceway surface 13A and outer-ring raceway surface 11A at roller rolling surface 12A. The plurality of tapered rollers 12 are arranged at prescribed pitches in the circumferential direction in cage 14 made of a metal. Thus, tapered roller 12 is held on the annular raceway of outer ring 11 and inner ring 13 in a rollable manner. Tapered roller bearing 10 is constructed such that the apex of a cone including outer-ring raceway surface 11A, the apex of a cone including inner-ring raceway surface 13A, and the apex of a cone including the locus of a rotation axis of tapered roller 12 when the roller rolls meet at one point (a point O in FIG. 3) on the centerline of the bearing. According to such a construction, outer ring 11 and inner ring 13 of tapered roller bearing 10 are rotatable relative to each other. Cage 14 is not limited to a cage made of a metal and may be made of a synthetic resin.

Outer ring 11, inner ring 13, and tapered roller 12 are made, for example, of high-carbon chromium bearing steel defined under JIS, and more specifically SUJ2 defined under JIS.

As shown in FIG. 2, nitrogen enriched layers 11B and 13B are formed in raceway surface 11A of outer ring 11 and raceway surface 13A of inner ring 13, respectively. In inner ring 13, nitrogen enriched layer 13B extends from raceway surface 13A to a smaller flange surface 19 and a larger flange surface 18. Nitrogen enriched layers 11B and 13B are regions higher in nitrogen concentration than an unnitrided portion 11C of outer ring 11 and an unnitrided portion 13C of inner ring 13. Smaller flange face 19 of inner ring 13 is finished to a ground surface in parallel to a smaller end face 17 of tapered roller 12 disposed on raceway surface 13A. Larger flange surface 18 of inner ring 13 is finished to a ground surface extending along a larger end face 16 of tapered roller 12. An undercut 25A is provided at a corner where inner-ring raceway surface 13A and larger flange surface 18 meet each other.

Nitrogen enriched layer 12B is formed in a surface of tapered roller 12 including rolling surface 12A. Nitrogen enriched layer 12B may be formed in larger end face 16 or smaller end face 17 of tapered roller 12. Nitrogen enriched layer 12B is a region higher in nitrogen concentration than an unnitrided portion 12C of tapered roller 12. Nitrogen enriched layers 11B, 12B, and 13B can be formed by any conventionally well-known method such as carbonitriding and nitriding.

Nitrogen enriched layer 12B may be formed only in tapered roller 12, nitrogen enriched layer 11B may be formed only in outer ring 11, or nitrogen enriched layer 13B may be formed only in inner ring 13. Alternatively, a nitrogen enriched layer may be formed in two of outer ring 11, inner ring 13, and tapered roller 12. At least any one of outer ring 11, inner ring 13, and tapered roller 12 should only include a nitrogen enriched layer.

Thickness of Nitrogen Enriched Layer and Concentration of Nitrogen in Nitrogen Enriched Layer:

A thickness of each of nitrogen enriched layers 11B, 12B, and 13B is 0.2 mm or more. Specifically, a distance from outer-ring raceway surface 11A as an outermost surface of a surface layer of outer ring 11 to a bottom of nitrogen enriched layer 11B is not shorter than 0.2 mm. A distance from rolling surface 12A as a part of an outermost surface of a surface layer of tapered roller 12 to a bottom of nitrogen enriched layer 12B is not shorter than 0.2 mm. A distance from larger end face 16 or smaller end face 17 as a part of the outermost surface of the surface layer of tapered roller 12 to the bottom of nitrogen enriched layer 12B is not shorter than 0.2 mm. A distance from inner-ring raceway surface 13A as a part of an outermost surface of a surface layer of inner ring 13 to a bottom of nitrogen enriched layer 13B is not shorter than 0.2 mm. A distance from larger flange surface 18 as a part of the outermost surface of the surface of inner ring 13 to the bottom of nitrogen enriched layer 13B is not shorter than 0.2 mm.

A nitrogen concentration in nitrogen enriched layers 11B, 12B, and 13B at a position of depth of 0.05 mm from the outermost surface is not lower than 0.1 mass % in tapered roller bearing 10.

Ratio $R/R_{BASE}$ Between Radius of Curvature R of Larger End Face 16 of Tapered Roller 12 and Distance $R_{BASE}$ from Point O to Larger Flange Surface 18 of Inner Ring 13:

As shown in FIG. 3, apexes of cone angles of tapered roller 12 and raceway surfaces 11A and 13A of outer ring 11 and inner ring 13 meet at one point O on the centerline of tapered roller bearing 10. Ratio $R/R_{BASE}$ between radius of curvature (which is also called a set radius of curvature) R of larger end face 16 of tapered roller 12 and distance $R_{BASE}$ from point O to larger flange surface 18 of inner ring 13 is not smaller than 0.75 and not greater than 0.87.

Shape of Larger End Face 16 of Tapered Roller 12:

Ratio $R_{process}/R$ between actual radius of curvature $R_{process}$ and set radius of curvature R is not lower than 0.5, where $R_{process}$ represents an actual radius of curvature after grinding of larger end face 16 of tapered roller 12. Specific description will be provided below.

FIGS. 4 and 5 are schematic cross-sectional views along an axis of rolling of tapered roller 12 obtained when grinding is ideally performed. When grinding is ideally performed, obtained larger end face 16 of tapered roller 12 defines a part of a spherical surface around point O (see FIG. 3) which is the apex of the cone angle of tapered roller 12. As shown in FIGS. 4 and 5, when such grinding as leaving a part of a projection 16A is ideally performed, larger end face 16 of tapered roller 12 including an end face of projection 16A defines a part of one spherical surface around the apex of the cone angle of tapered roller 12. In this case, an inner circumferential end of projection 16A in a radial direction around the axis of rolling (axis of rotation) of tapered roller 12 is connected to a recess 16B with points C2 and C3 being interposed. Projection 16A has an outer circumferential end connected to a chamfered portion 16C with points C1 and C4 being interposed. In the ideal larger end face, points C1 to C4 are arranged on one spherical surface as described above.

In general, a tapered roller is manufactured by successively subjecting a columnar machined component for a roller to forging and grinding including crowning. In a central portion of a surface to be a larger end face of a formed product obtained by forging, a recess resulting from a shape of a punch of a forging apparatus is provided. The recess has, for example, a circular two-dimensional shape.

Radius of curvature (set radius of curvature) R of larger end face 16 of tapered roller 12 refers to an R dimension when larger end face 16 of tapered roller 12 shown in FIG. 4 is a set ideal spherical surface. Specifically, as shown in FIG. 5, points C1, C2, C3, and C4 at an end of larger end face 16 of tapered roller 12, a point P5 intermediate between points C1 and C2, and a point P6 intermediate between points C3 and C4 are considered. When larger end face 16 is defined by the ideal spherical surface, in the cross-section shown in FIG. 5, larger end face 16 is defined by an ideal single arcuate curve that satisfies such a condition that a radius of curvature R152 which passes through points C1, P5, and C2, a radius of curvature R364 which passes through points C3, P6, and C4, and a radius of curvature R1564 which passes through points C1, P5, P6, and C4 satisfy relation of R152=R364=R1564. Points C1 and C4 are points of connection between projection 16A and chamfered portion 16C and points C2 and C3 are points of connection between projection 16A and recess 16B. A radius of curvature of the ideal single arcuate curve which satisfies relation of R=R152=R364=R1564 is called a set radius of curvature. Set radius of curvature R is different from actual radius of curvature $R_{process}$ measured as a radius of curvature of larger end face 16 of tapered roller 12 obtained by actual grinding as will be described later. Positions of points C2 and C3 are not limited to the positions in FIG. 5. For example, point C2 may slightly be displaced toward point C1 and point C3 may slightly be displaced toward point C4.

FIG. 6 is a schematic cross-sectional view along the axis of rolling of the tapered roller obtained by actual grinding. FIG. 6 shows the ideal larger end face shown in FIG. 5 with a dotted line. As shown in FIG. 6, larger end face 16 of tapered roller 12 actually obtained by grinding a formed product provided with the recess and the projection as above does not define a part of one spherical surface around an apex of a cone angle of tapered roller 12. Points C1 to C4 on the projection of actually obtained tapered roller 12 sag as compared with projection 16A shown in FIG. 5. As compared with points C1 and C4 shown in FIG. 5, points C1 and C4 shown in FIG. 6 are arranged on an outer circumferential side in the radial direction with respect to the center of the axis of rolling and arranged on an inner side in a direction of extension of the axis of rolling (R152 on one side with respect to R1564 of the entire larger end face 16 being not identical but being small).

As compared with points C2 and C3 shown in FIG. 5, points C2 and C3 shown in FIG. 6 are arranged on an inner circumferential side in the radial direction with respect to the center of the axis of rolling and arranged on the inner side in the direction of extension of the axis of rolling (R364 on one side with respect to R1564 of the entire larger end face 16 not being identical but being small). Intermediate points P5 and P6 shown in FIG. 6 are formed at positions substantially equal to intermediate points P5 and P6 shown, for example, in FIG. 5.

As shown in FIG. 6, in the larger end face actually formed by grinding, apex C1 and apex C2 are arranged on one spherical surface and apex C3 and apex C4 are arranged on another spherical surface. In general grinding, a radius of curvature of one circular arc defined by a part of the larger end face formed on one projection is substantially equal to a radius of curvature of a circular arc defined by a part of the larger end face formed on the other projection. R152 on one side after working of larger end face 16 of tapered roller 12 shown in FIG. 6 is substantially equal to R364 on the other side. R152 and R364 on one side after working of larger end face 16 of tapered roller 12 are called actual radius of curvature $R_{process}$. Actual radius of curvature $R_{process}$ is not greater than set radius of curvature R.

Tapered roller 12 of the tapered roller bearing according to the present first embodiment has ratio $R_{process}/R$ of actual radius of curvature $R_{process}$ to set radius of curvature R not lower than 0.5 as described above.

As shown in FIG. 6, in the larger end face actually formed by grinding, a radius of curvature $R_{virtual}$ (which is referred to as a virtual radius of curvature below) of a virtual circular arc which passes through apex C1, intermediate point P5, intermediate point P6, and apex C4 is not greater than set radius of curvature R. Tapered roller 12 of the tapered roller bearing according to the present first embodiment has a ratio $R_{process}/R_{virtual}$ of actual radius of curvature $R_{process}$ to virtual radius of curvature $R_{virtual}$ not lower than 0.5.

Surface Roughness of Larger End Face 16 of Tapered Roller 12:

Arithmetic mean roughness (surface roughness) Ra of larger end face 16 may be not greater than 0.10 μm Ra. Description will be given below with reference to FIGS. 4 and 5. Larger end face 16 includes chamfered portion 16C, projection 16A, and recess 16B. In larger end face 16, chamfered portion 16C is arranged around an outermost circumference. Annular projection 16A is arranged on the inner circumferential side of chamfered portion 16C. Recess 16B is arranged on the inner circumferential side of projection 16A. Projection 16A is a surface that projects relative to recess 16B. Chamfered portion 16C is formed to connect projection 16A to the rolling surface which is a side surface of tapered roller 12. Arithmetic mean roughness Ra of larger end face 16 described above substantially means surface roughness of projection 16A. In larger end face 16 of tapered roller 12, a difference between a maximum value and a minimum value of arithmetic mean roughness Ra of projection 16A which is an annular surface region in contact with larger flange surface 18 may be not greater than 0.02 μm. Variation in surface roughness Ra in the annular surface region of larger end face 16 can thus sufficiently be lessened and a sufficient oil film thickness in the portion of contact can consequently be ensured by a synergistic effect of the numerical range of ratio $R/R_{BASE}$ and the numerical range of ratio $R_{process}/R$.

Larger flange surface 18 is ground to surface roughness, for example, not greater than 0.12 μm Ra. Preferably, the larger flange surface has arithmetic mean roughness Ra not greater than 0.063 μm Ra.

Figure 8:
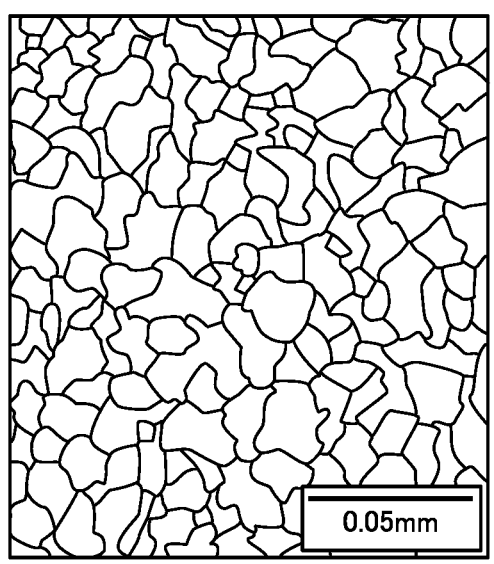
FIG. 8 illustrates a prior austenite crystal grain boundary of a conventional bearing component.

Crystal Structure of Nitrogen Enriched Layer:

A grain size number defined under JIS, of a prior austenite crystal grain size in nitrogen enriched layers 11B, 12B, and 13B is equal to or greater than 10. FIG. 7 is a schematic diagram illustrating a microstructure, in particular a prior austenite crystal grain boundary, of a bearing component constituting the tapered roller bearing according to the present first embodiment. FIG. 8 is a schematic diagram illustrating a prior austenite crystal grain boundary of a conventional hardened bearing component. FIG. 7 shows a microstructure in nitrogen enriched layer 12B. A grain size number defined under the JIS, of a prior austenite crystal grain size in nitrogen enriched layer 12B in the present first embodiment is equal to or greater than 10, and the grain size is sufficiently fine even in comparison with a prior austenite crystal grain size of a conventional general hardened product shown in FIG. 8.

Figure 9:
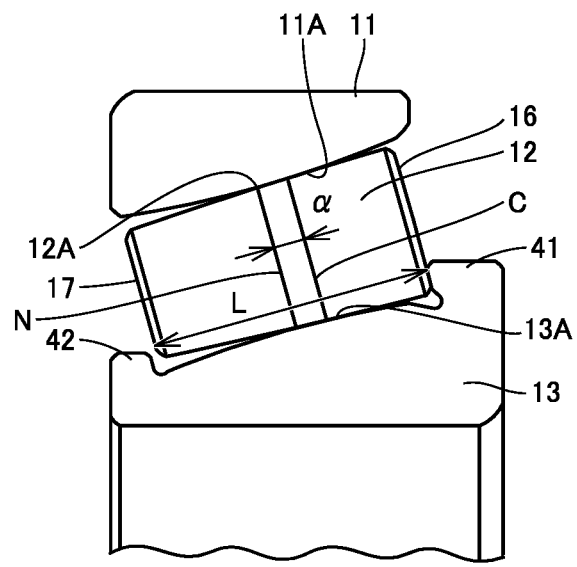
FIG. 9 is a schematic cross-sectional view showing an exemplary method of changing a position of abutment between an inner-ring raceway surface and a rolling surface in the tapered roller bearing according to the first embodiment.

Position of Abutment Between Rolling Surface of Tapered Roller 12 and Inner-Ring Raceway Surface:

As shown in FIG. 9, in tapered roller bearing 10, a ratio α/L may be not lower than 0% and lower than 20% where L represents a width of rolling surface 12A in a direction of extension of the axis of rolling of tapered roller 12 and α represents an amount of displacement from a midpoint N of rolling surface 12A in the direction of extension, of a center C of a position of abutment between inner-ring raceway surface 13A and rolling surface 12A toward larger end face 16.

The present inventors have confirmed that, by setting ratio α1 to be not lower than 0% and lower than 20% and setting center C of the position of abutment when ratio α/L exceeds 0% to be located at center N of the rolling surface in the direction of extension of the axis of rolling or closer to larger end face 16 than center N, a skew angle can be decreased and increase in rotational torque can be suppressed as compared with an example in which center C of the position of abutment when ratio α/L exceeds 0% is located closer to smaller end face 17 than center N of the rolling surface in the direction of extension of the axis of rolling.

Table 1 shows a result of calculation of each ratio of a skew angle φ and rotational torque M with displacement amount α being varied to a skew angle φ0 and rotational torque M0 when displacement amount α is 0, that is, when center C of the position of abutment between inner-ring raceway surface 13A and outer-ring raceway surface 11A, and rolling surface 12A of tapered roller 12 is located at center N of rolling surface 12A in the direction of extension of the axis of rolling. Table 1 shows displacement amount α as a ratio (α/L) of displacement amount α to width L of rolling surface 12A of tapered roller 12. Table 1 shows with a negative value, a displacement amount when the position of abutment is displaced toward smaller end face 17 relative to center N. Values of skew angle φ0 and rotational torque M0 are those at the time when displacement amount α is 0.

TABLE 1

| Ratio α/L (%) | −10 | −5 | 0 | 5 | 10 | 15 | 20 |
|---|---|---|---|---|---|---|---|
| Skew Angle Ratio φ/φ0 | 2 | 1.5 | 1 | 0.75 | 0.5 | 0.4 | 0.3 |
| Rotational Torque Ratio M/M0 | 1.2 | 1.1 | 1 | 1.03 | 1.05 | 1.1 | 1.2 |
| Determination | NG | NG | OK | OK | OK | OK | NG |

As shown in Table 1, it can be seen that skew angle φ is smaller when abutment occurs on a larger diameter side than when ratio α/L in connection with displacement amount α is 0%. Though rotational torque M increases with increase in displacement amount α, influence thereby is greater when abutment occurs on a smaller diameter side than when abutment occurs on the larger diameter side. Since the skew angle is 1.5 time larger when ratio α/L in connection with displacement amount α is −5%, influence on heat generation is unignorable and such a case is determined as not being suitable for practical use (NG). When a/L is equal to or higher than 20%, sliding at rolling surface 12A of tapered roller 12 is greater and rotational torque M increases, which leads to another disadvantage such as peeling. Therefore, such a case is determined as not being suitable for practical use (NG).

In view of results above, in order to decrease skew angle φ and rotational torque M, ratio α/L in connection with displacement amount α is desirably not lower than 0% and lower than 20%. Preferably, ratio α/L exceeds 0%. Furthermore, ratio α/L may exceed 0% and be lower than 15%.

Figure 10:
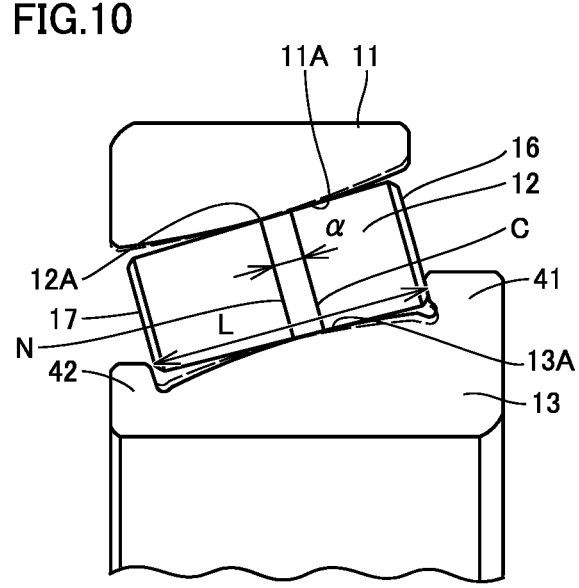
FIG. 10 is a cross-sectional view showing another exemplary method of changing a position of abutment between a rolling contact surface and a rolling surface in the tapered roller bearing according to the first embodiment.

A construction where ratio α/L exceeds 0% is shown, for example, in FIGS. 9 and 10. FIGS. 9 and 10 are schematic cross-sectional views showing exemplary methods of changing a position of abutment between inner-ring raceway surface 13A and outer-ring raceway surface 11A, and rolling surface 12A in the tapered roller bearing.

As shown in FIG. 9, the construction can be achieved by relatively displacing a position of an apex of each of the crowning profile formed in rolling surface 12A of tapered roller 12 and the crowning profile formed in inner-ring raceway surface 13A and outer-ring raceway surface 11A.

The construction where ratio α/L exceeds 0% can be achieved by relatively changing an angle formed by inner-ring raceway surface 13A with respect to the axial direction of the inner ring and an angle formed by outer-ring raceway surface 11A with respect to the axial direction of outer ring 11 as shown in FIG. 10. Specifically, the construction where ratio α/L exceeds 0% can be achieved by at least any method of making the angle formed by inner-ring raceway surface 13A with respect to the axial direction of inner ring 13 greater and making the angle formed by outer-ring raceway surface 11A with respect to the axial direction of outer ring 11 smaller than in an example where displacement amount α of the position of abutment shown with the dotted line in FIG. 10 is zero.

Figure 11:
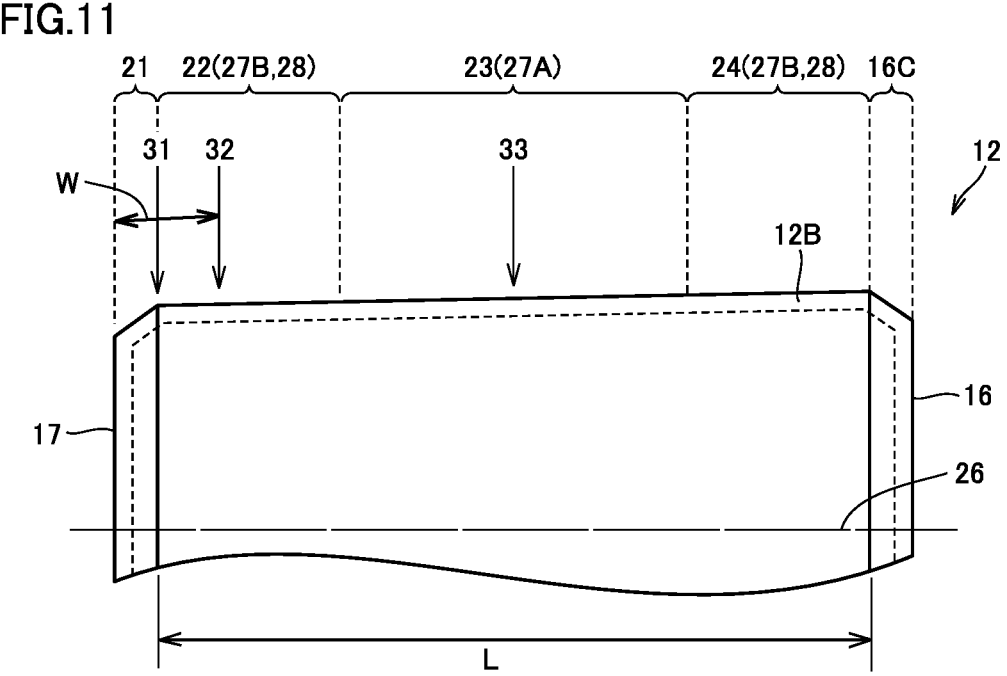
FIG. 11 is a diagram for illustrating a shape of the nitrogen enriched layer in a crowned portion and a central portion of a roller of the tapered roller bearing according to the first embodiment.

Shape of Rolling Surface of Tapered Roller 12:

As shown in FIG. 11, rolling surface 12A (see FIG. 2) of tapered roller 12 includes crowned portions 22 and 24 located at opposing ends and a central portion 23 connecting crowned portions 22 and 24 to each other. Central portion 23 is uncrowned and linear in a cross section in a direction along a centerline 26 representing the rotation axis of tapered roller 12. A chamfered portion 21 is formed between smaller end face 17 of tapered roller 12 and crowned portion 22. Chamfered portion 16C is also formed between larger end face 16 of tapered roller 12 and crowned portion 24.

Figure 12:
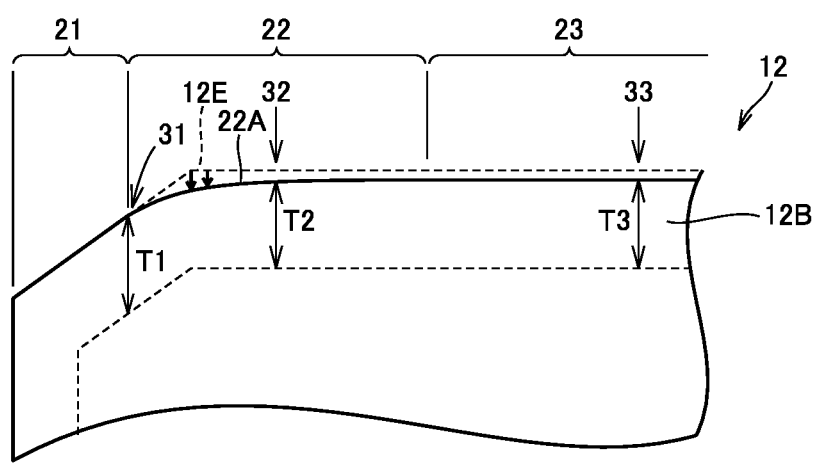
FIG. 12 is a diagram for illustrating a shape of a logarithmic crowning profile of the roller of the tapered roller bearing according to the first embodiment.

In a method of manufacturing tapered roller 12, in treatment for forming nitrogen enriched layer 12B (carbonitriding treatment), tapered roller 12 is not crowned but an outer geometry of tapered roller 12 is a yet-to-be-worked surface 12E shown with a dotted line in FIG. 12. After the nitrogen enriched layer is formed in this state, tapered roller 12 has a side surface worked as shown with an arrow in FIG. 12 as finishing so that crowned portions 22 and 24 are obtained as shown in FIGS. 11 and 12.

Specific Example of Thickness of Nitrogen Enriched Layer:

A depth of nitrogen enriched layer 12B in tapered roller 12, that is, a distance from the outermost surface of nitrogen enriched layer 12B to the bottom of nitrogen enriched layer 12B, is 0.2 mm or more as described above. Specifically, at a first measurement point 31 representing a boundary point between chamfered portion 21 and crowned portion 22, a second measurement point 32 at a distance W of 1.5 mm from smaller end face 17, and a third measurement point 33 at the center of rolling surface 12A of tapered roller 12, depths T1, T2, and T3 of nitrogen enriched layer 12B at these positions are 0.2 mm or more. The depth of nitrogen enriched layer 12B means a thickness of nitrogen enriched layer 12B in a radial direction orthogonal to centerline 26 of tapered roller 12 and toward the outer circumference. Values of depths T1, T2, and T3 of nitrogen enriched layer 12B can be modified as appropriate, depending on a shape and a size of chamfered portions 21 and 16C and a process condition such as a condition for treatment to form nitrogen enriched layer 12B and a condition for finishing. For example, in the exemplary construction shown in FIG. 12, depth T2 of nitrogen enriched layer 12B is smaller than other depths T1 and T3 due to formation of a crowning profile 22A after formation of nitrogen enriched layer 12B as described above. By changing the process condition described above, however, relation in magnitude among the values of depths T1, T2, and T3 of nitrogen enriched layer 12B can be modified as appropriate.

A thickness of nitrogen enriched layers 11B and 13B in outer ring 11 and inner ring 13 representing a distance from the outermost surface to the bottom thereof is again not smaller than 0.2 mm as described above. The thickness of nitrogen enriched layers 11B and 13B means a distance to nitrogen enriched layers 11B and 13B in a direction perpendicular to the outermost surface of nitrogen enriched layers 11B and 13B.

Crowning Profile:

A crowning profile formed in a contact area crowned portion 27 included in crowned portions 22 and 24 of tapered roller 12 (which is a portion continuous to central portion 23 and in contact with inner-ring raceway surface 13A) is defined as below. Specifically, a sum of crown drops is expressed in a y-z coordinate system with a generatrix of rolling surface 12A of tapered roller 12 being defined as the y axis and a direction orthogonal to the generatrix being defined as the z axis by an expression (1) below where $K_1$, $K_2$, and $z_m$ represent design parameters, Q represents a load, L represents a length of an effective contact portion of rolling surface 12A of tapered roller 12 along the generatrix, E' represents an equivalent elastic modulus, a represents a length from an origin on the generatrix of the rolling surface of tapered roller 12 to an end of the effective contact portion, and A is defined as $A=2K_1Q/\pi LE'$.

[Expression 1]

$$z(y) = A \ln \frac{1}{1-\left\{1-\exp\left(-\frac{z_m}{A}\right)\right\}\left(\frac{y-a}{K_2 a}+1\right)^2} \quad (1)$$

The profile of crowned portions 22 and 24 of tapered roller 12 is a logarithmic curve crowning profile calculated in accordance with the expression above. Limitation to the expression above, however, is not intended, and a logarithmic curve may be calculated by using another logarithmic crowning profile expression.

Figure 13:
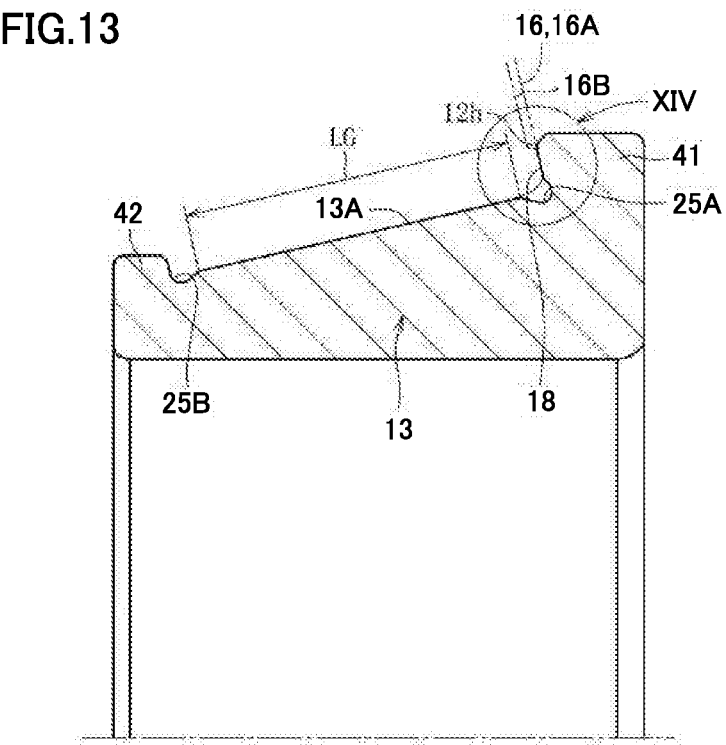
FIG. 13 is a partial schematic cross-sectional view showing a detailed shape of the inner ring of the tapered roller bearing according to the first embodiment.
Figure 14:
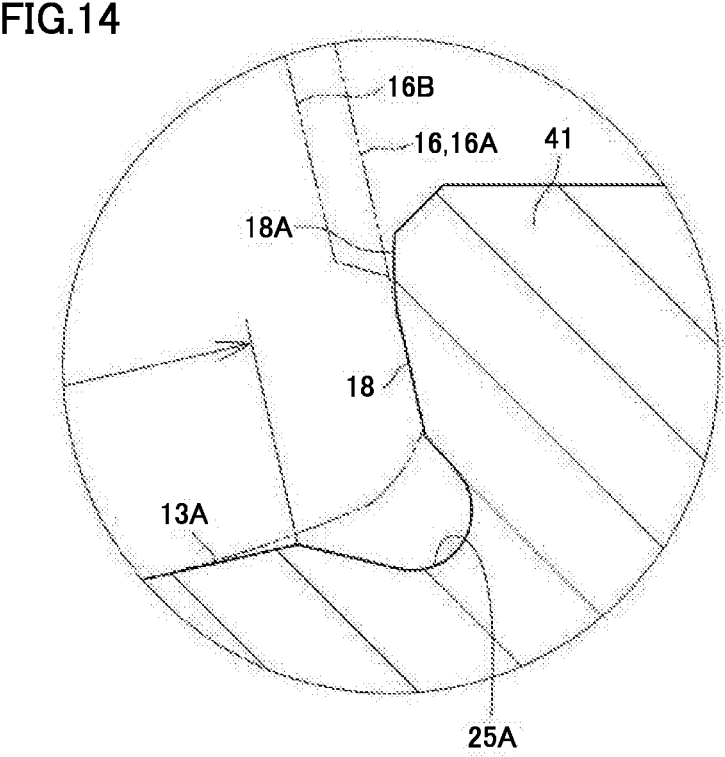
FIG. 14 is an enlarged schematic diagram of a region XIV in FIG. 13.
Figure 15:
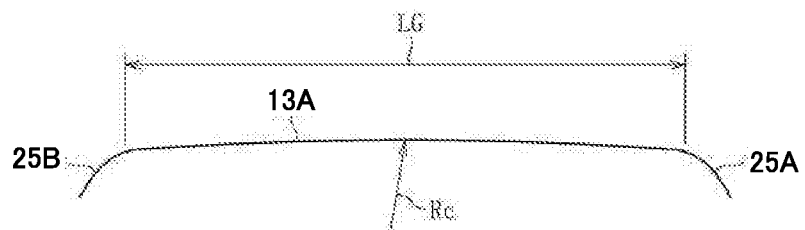
FIG. 15 is a schematic diagram showing a shape in a direction of a generatrix, of the inner-ring raceway surface shown in FIG. 13.

Shape of Inner-Ring Raceway Surface and Outer-Ring Raceway Surface:

A shape of inner-ring raceway surface 13A in the direction of the generatrix will now be described with reference to FIGS. 13 to 15. FIG. 13 is a partial schematic cross-sectional view showing a detailed shape of inner ring 13. FIG. 14 is an enlarged schematic diagram of a region XIV in FIG. 13. FIG. 15 is a schematic diagram showing a shape in the direction of the generatrix, of inner-ring raceway surface 13A shown in FIG. 13. FIGS. 13 and 14 show a partial contour of tapered roller 12 on a side of larger end face 16 with a chain double-dotted line.

As shown in FIGS. 13 to 15, inner-ring raceway surface 13A is formed to have a gently arcuate full crowning profile and connected to undercuts 25A and 25B. A radius of curvature Rc of the gently arcuate full crowning profile is extremely large to such an extent as causing drop, for example, of approximately 5 μm at opposing ends of inner-ring raceway surface 13A. As shown in FIG. 13, since undercuts 25A and 25B are provided in inner-ring raceway surface 13A, an effective raceway surface width LG of inner-ring raceway surface 13A is set.

As shown in FIG. 14, a flank 18A smoothly connected to larger flange surface 18 is formed on a radially outer side of larger flange surface 18. A gap in a wedge shape provided between flank 18A and larger end face 16 of tapered roller 12 can enhance a function to draw in lubricating oil and form a sufficient oil film. Though the gently arcuate full crowning profile is exemplified as the shape of inner-ring raceway surface 13A in the direction of the generatrix, the shape thereof may be straight without being limited as such.

Though the shape of inner-ring raceway surface 13A of inner ring 13 in the direction of the generatrix has been described above, the shape of outer-ring raceway surface 11A in the direction of the generatrix is also similar and hence description will not be repeated.

A result of verification will now be described, from which the present embodiment is derived where rolling surface 12A of tapered roller 12 has a logarithmic crowning profile (central portion 23 being straight) and inner-ring raceway surface 13A and outer-ring raceway surface 11A have a straight shape or a gently arcuate full crowning profile.

A contact surface pressure of outer-ring raceway surface 11A and a ratio of a contact ellipse to effective rolling surface width L (see FIG. 11) of rolling surface 12A of tapered roller 12 under a low-speed condition (a first speed) with misalignment and a high-speed condition (a fourth speed) without misalignment, of a tapered roller bearing (having an inner diameter of ϕ35 mm, an outer diameter of ϕ62 mm, and a width 18 mm) for a transmission of an automobile were verified. Table 2 shows samples used for verification.

TABLE 2

| Sample 1 | Sample 2 |
|---|---|
| Based on the present embodiment Tapered roller: Having logarithmic crowning profile (the central portion being straight and drop at opposing ends of the rolling surface being as large as approximately from 20 to 30 μm) Inner ring and outer ring: Being straight or having full crowning profile (drop being small around 5 μm) | Tapered roller: Having full crowning profile (drop at opposing ends of the rolling surface being as small as approximately 3 μm) Inner ring: Having cut crowning profile (the central portion being straight and drop at opposing ends of the inner-ring raceway surface being as large as approximately 15 μm) Outer ring: Having full crowning profile (drop at opposing ends of the outer-ring raceway surface being as large as approximately 20 μm) |

Table 3 shows results of verification.

TABLE 3

| Verification Condition | Sample | Contact Pressure at Outer-Ring Raceway Surface (MPa) | | Contact Ellipse (Radius of Major Axis)/Roller Effective Rolling Surface Width LW (%) | Determination |
| --- | --- | --- | --- | --- | --- |
| | | $P_{MAX}$ | $P_{EDGE}$ | | |
| Without Misalignment (High-Speed Condition) | Sample 1 | 2000 | None | 75 | OK |
| | Sample 2 | 1500 | None | 55 | NG |
| With Misalignment (Low-Speed Condition) | Sample 1 | 3000 | None | 78 | OK |
| | Sample 2 | 2500 | Yes | 100 | NG |

Under the high-speed condition without misalignment, a load condition was relatively light. Therefore, as shown in Table 3, no edge contact pressure ($P_{EDGE}$) was produced in samples 1 and 2. In sample 2, drop of full crowning of the outer ring was large and the contact ellipse (a radius of a major axis) was short. Therefore, variation in center C of the position of abutment was greater and skew of the tapered roller was more likely to be induced than in an example where an area of contact was long, and hence sample 2 was determined as not being suitable for practical use (NG).

Under the low-speed condition with misalignment, high load was applied. Therefore, in sample 2, a ratio of the contact ellipse to roller effective rolling surface width L was 100% and the edge contact pressure was produced in the outer ring. Furthermore, edge contact occurred, which led to drive in a state of contact on the side of the smaller end face of the tapered roller. Therefore, large skew was induced and sample 2 was determined as not being suitable for practical use (NG).

As set forth above, it was verified that full crowning large in drop was preferably not provided in the outer ring for suppressing skew, and significance of sample 1 could be confirmed.

<Method of Measuring Various Characteristics>

Method of Measuring Nitrogen Concentration:

Bearing components such as outer ring 11, tapered roller 12, and inner ring 13 are subjected to line analysis in a direction of depth by Electron Probe Micro Analysis (EPMA) in cross-sections perpendicular to surfaces of regions where nitrogen enriched layers 11B, 12B, and 13B are formed. Measurement is conducted by cutting each bearing component from a measurement position in a direction perpendicular to the surface to expose a cut surface and subjecting the surface to measurement. For example, tapered roller 12 is cut from each of first measurement point 31 to third measurement point 33 shown in FIG. 11 in a direction perpendicular to centerline 26 to expose a cut surface. The cut surface is analyzed for a nitrogen concentration by EPMA at a plurality of measurement positions each located at a distance of 0.05 mm inward from the surface of tapered roller 12. For example, five measurement positions are determined, and an average value of measurement data obtained at the five locations is adopted as a nitrogen concentration of tapered roller 12.

For outer ring 11 and inner ring 13, for example, a central portion of raceway surfaces 11A and 13A in the direction of the central axis of the bearing is set as a measurement position and a cross-section along the central axis and a radial direction orthogonal to the central axis is exposed, and the cross-section is thereafter subjected to nitrogen concentration measurement in the same manner as described above.

Method of Measuring Distance from Outermost Surface to Bottom of Nitrogen Enriched Layer:

Outer ring 11 and inner ring 13 are subjected to hardness distribution measurement in a direction of depth from a surface in the cross-section subjected to measurement in the method of measuring a nitrogen concentration. A Vickers hardness measurement instrument can be employed as a measurement apparatus. Tapered roller bearing 10 tempered at a heating temperature of 500° C.×a heating time period of 1 h is subjected to hardness measurement at a plurality of measurement points aligned in the direction of depth such as measurement points arranged at intervals of 0.5 mm. A region having a Vickers hardness of HV 450 or more is determined as a nitrogen enriched layer.

Tapered roller 12 is subjected to hardness distribution measurement in the direction of depth as described above in a cross-section at first measurement point 31 shown in FIG. 11, to determine the region of the nitrogen enriched layer.

Method of Measuring Radius of Curvature of Larger End Face of Roller:

Actual radius of curvature $R_{process}$ and virtual radius of curvature $R_{virtual}$ at larger end face 16 of tapered roller 12 shown in FIG. 6 actually formed by grinding can be measured by any method, and can be measured, for example, by using a surface roughness measurement instrument (for example, Surface Roughness Tester Surftest SV-3100 manufactured by Mitutoyo Corporation). When the surface roughness measurement instrument is used, an axis of measurement is initially set along the radial direction around the axis of rolling and a surface texture of the larger end face (the shape in the direction of the generatrix) is determined. Apexes C1 to C4 and intermediate points P5 and P6 are plotted on the obtained profile of the larger end face. Actual radius of curvature $R_{process}$ is calculated as a radius of curvature of a circular arc which passes through plotted apex C1, intermediate point P5, and apex C2. Virtual radius of curvature $R_{virtual}$ is calculated as a radius of curvature of a circular arc which passes through plotted apex C1, intermediate points P5 and P6, and apex C4. Alternatively, virtual radius of curvature $R_{virtual}$ of the entire larger end face 16 may be determined by calculating a radius of an approximated arcuate curve based on values at four points taken by using a command "input a plurality of times". The shape of larger end face 16 in the direction of the generatrix is measured once in a direction of the diameter.

Set radius of curvature R is estimated from each dimension of the tapered roller obtained by actual grinding, for example, based on such an industrial standard as JIS.

Method of Measuring Surface Roughness:

Arithmetic mean roughness Ra of larger end face 16 of tapered roller 12 can be measured by any method, and can be measured, for example, by using a surface roughness measurement instrument (for example, Surface Roughness Tester Surftest SV-3100 manufactured by Mitutoyo Corporation). Arithmetic mean roughness Ra of the larger end face can be measured, for example, by a method of bringing a stylus of the measurement instrument into contact with larger end face 16 of tapered roller 12. In larger end face 16, a difference between a maximum value and a minimum value of arithmetic mean roughness Ra of projection 16A which is an annular surface region in contact with the larger flange surface can be found by measuring arithmetic mean roughness Ra by using the surface roughness measurement instrument at any four locations in projection 16A and calculating a difference between the maximum value and the minimum value of the surface roughness at the four locations.

<Function and Effect of Tapered Roller Bearing>

The present inventors have paid attention to matters below on the tapered roller bearing and derived the construction of the tapered roller bearing described above.

(1) A ratio between a set radius of curvature and an actual radius of curvature after working, of the larger end face of the tapered roller (2) A shape of the raceway surface of the inner ring and the outer ring for suppressing skew of the tapered roller (3) Application of the logarithmic crowning profile to the rolling surface of the tapered roller (4) Application of the nitrogen enriched layer to the tapered roller, the inner ring, and the outer ring According to tapered roller bearing 10 in the present embodiment, by setting a value of ratio $R/R_{BASE}$ between set radius of curvature R and distance $R_{BASE}$ as described above, a sufficient oil film thickness can be ensured in the portion of contact between larger end face 16 of tapered roller 12 and larger flange surface 18 of inner ring 13 to suppress contact between tapered roller 12 and larger flange surface 18 and occurrence of wear and suppress heat generation in the portion of contact.

Figure 16:
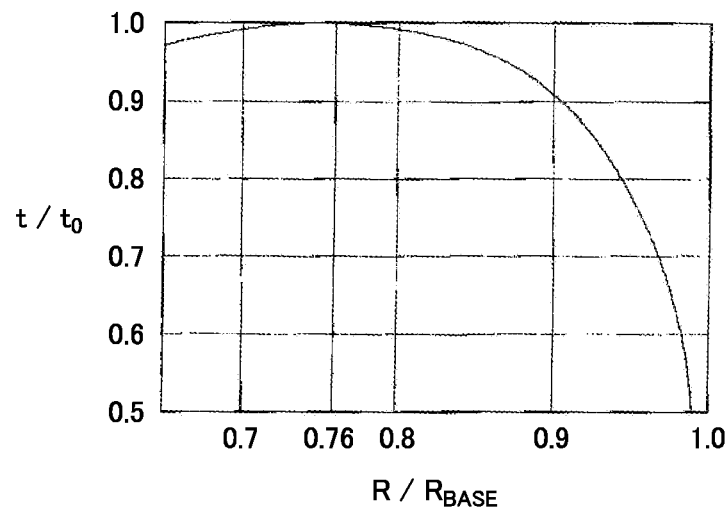
FIG. 16 shows a graph showing relation between a radius of curvature of a larger end face of the roller of the tapered roller bearing according to the first embodiment and a thickness of an oil film.

The value of ratio $R/R_{BASE}$ is determined with reference to finding below. FIG. 16 shows a result of calculation by using the Karna expression, of a thickness t of the oil film formed between larger flange surface 18 of inner ring 13 and larger end face 16 of tapered roller 12. The ordinate represents a ratio $t/t_0$ of thickness t of the oil film to a thickness $t_0$ of the oil film when a condition of $R/R_{BASE}=0.76$ is satisfied. Thickness t of the oil film is maximal when a condition of $R/R_{BASE}=0.76$ is satisfied and abruptly decreases as $R/R_{BASE}$ exceeds 0.87.

Figure 17:
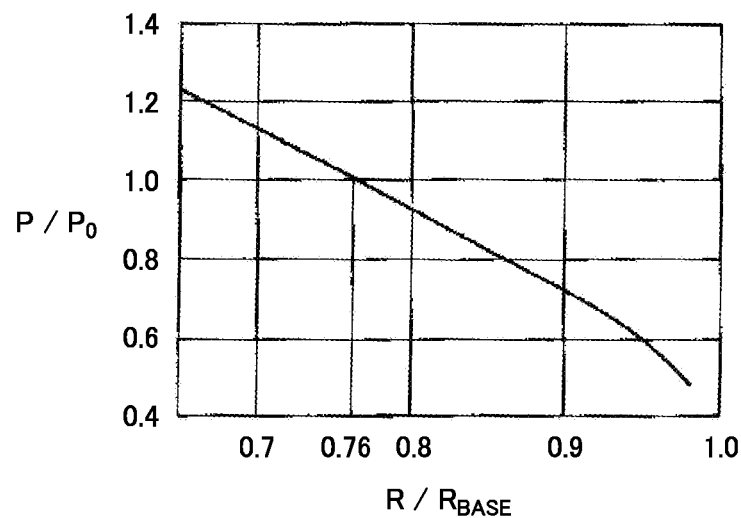
FIG. 17 shows a graph showing relation between a radius of curvature of the larger end face of the roller of the tapered roller bearing according to the first embodiment and maximum Hertz stress.

FIG. 17 shows a result of calculation of maximum Hertz stress P between larger flange surface 18 of inner ring 13 and larger end face 16 of tapered roller 12. The ordinate represents a ratio $P/P_0$ to maximum Hertz stress $P_0$ at the time when a condition of $R/R_{BASE}=0.76$ is satisfied as in FIG. 16. Maximum Hertz stress P monotonously decreases with increase in $R/R_{BASE}$. In order to lessen torque loss and heat generation due to sliding friction between larger flange surface 18 of inner ring 13 and larger end face 16 of tapered roller 12, desirably, thickness t of the oil film is made larger and maximum Hertz stress P is made smaller. The present inventors have determined a condition for ratio $R/R_{BASE}$ with reference to the results of calculation in FIGS. 16 and 17 and in consideration of results of seizure resistance tests and an intersection range in manufacturing.

Though relation between ratio $R/R_{BASE}$ and the oil film thickness is specified by using the Karna expression as shown in FIG. 16, a condition of use of the bearing such as a rotation speed of the bearing, load applied to the bearing, or viscosity of lubricating oil is also possible as a factor affecting the relation. As a result of studies conducted by the present inventor, in comprehensive consideration of such other factors, at a value of ratio $R/R_{BASE}$ of approximately 0.8, the oil film thickness can most sufficiently be maintained on average. Therefore, as described above, a range of values of ratio $R/R_{BASE}$ may be determined with 0.8 being defined as the median value.

By setting the value of ratio $R_{process}/R$ between actual radius of curvature $R_{process}$ and set radius of curvature R as described above, a contact surface pressure between larger end face 16 of tapered roller 12 and larger flange surface 18 of inner ring 13 can be lowered. Furthermore, skew of tapered roller 12 can be suppressed and the oil film thickness in the portion of contact between larger end face 16 and larger flange surface 18 can be ensured in a stable manner.

By setting the difference between the maximum value and the minimum value of arithmetic mean roughness Ra of the annular surface region (projection 16A) in contact with larger flange surface 18, in larger end face 16 of tapered roller 12, to 0.02 µm Ra or smaller, variation in arithmetic mean roughness Ra of the annular surface region of larger end face 16 can sufficiently be lessened. With the synergistic effect of the numerical range of ratio $R/R_{BASE}$ and the numerical range of ratio $R_{process}/R$, a sufficient oil film thickness in the portion of contact can consequently be ensured. Therefore, tapered roller bearing 10 capable of achieving suppressed heat generation in the portion of contact in a stable manner and achieving improved seizure resistance can be obtained.

Since nitrogen enriched layer 11B, 12B, or 13B is formed in at least any one of outer ring 11, inner ring 13, and tapered roller 12, tapered roller bearing 10 that achieves improved rolling fatigue life, long lifetime, and high durability is obtained. Since resistance against softening by tempering is improved by formation of nitrogen enriched layers 11B, 12B, and 13B, high seizure resistance can be exhibited even though a temperature of the portion of contact between larger end face 16 and larger flange surface 18 is increased due to sliding contact. Nitrogen enriched layers 12B and 13B may be formed in both of larger end face 16 and larger flange surface 18. Nitrogen enriched layer 12B may be formed in the annular surface region (projection 16A) in larger end face 16.

In tapered roller bearing 10, a grain size number defined under JIS, of a prior austenite crystal grain size in nitrogen enriched layers 11B, 12B, and 13B may be equal to or greater than 10. Since nitrogen enriched layers 11B, 12B, and 13B in which the prior austenite crystal grain size is sufficiently fine are formed in this case, tapered roller bearing 10 having long rolling fatigue life and improved Charpy impact value, fracture toughness value, and ultimate strength can be obtained.

In tapered roller bearing 10, ratio α/L between width L and displacement amount α may be not lower than 0% and lower than 20% where L represents a width of the rolling surface in the direction of extension of the axis of rolling of tapered roller 12 and a represents an amount of displacement from midpoint N of rolling surface 12A in the direction of extension, of a position of abutment between inner-ring raceway surface 13A and rolling surface 12A toward larger end face 16. From a different point of view, the position of abutment is preferably located at a central position of rolling surface 12A in the direction of extension of the axis of rolling or located closer to larger end face 16 than the central position. In this case, a distance from a position of generation of tangential force that generates skew in the roller (a position of contact between larger end face 16 and larger flange surface 18 of inner ring 13) to the position of abutment can be shorter than in an example where the position of abutment is located closer to the smaller end face than the central position of the rolling surface in the direction of extension of the axis of rolling, a skew angle of tapered roller 12 can be made smaller and increase in rotational torque can be suppressed.

In tapered roller bearing 10, in inner ring 13, undercut 25A may be provided in the corner where inner-ring raceway surface 13A and larger flange surface 18 meet each other. In this case, the end of rolling surface 12A of tapered roller 12 on the side of larger end face 16 is located in undercut 25A so that the end can be prevented from coming in contact with inner ring 13.

In tapered roller bearing 10, in the cross-section passing through the central axis of inner ring 13, inner-ring raceway surface 13A and outer-ring raceway surface 11A may be linear or arcuate. Rolling surface 12A of tapered roller 12 may be crowned. A sum of crown drops may be expressed in the y-z coordinate system with the generatrix of the rolling surface of tapered roller 12 being defined as the y axis and a direction orthogonal to the generatrix being defined as the z axis by the expression (1) where $K_1$, $K_2$, and $z_m$ represent design parameters, Q represents a load, L represents a length of an effective contact portion of rolling surface 12A of tapered roller 12 along the generatrix, E' represents an equivalent elastic modulus, a represents a length from an origin on the generatrix of rolling surface 12A of tapered roller 12 to an end of the effective contact portion, and A is defined as $A=2K_1Q/\pi LE'$.

[Expression 2]

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

In this case, since rolling surface 12A of tapered roller 12 is provided with a crowning profile having a contour line represented by such a logarithmic function (what is called a logarithmic crowning profile) that the expression (1) represents a sum of drops, local increase in contact pressure can be suppressed and wear of rolling surface 12A of tapered roller 12 can be suppressed as compared with an example where a conventional crowning profile represented by a partially circular arc is provided.

In the cross-section passing through the central axis of inner ring 13, inner-ring raceway surface 13A and outer-ring raceway surface 11A are linear or arcuate, the central portion of rolling surface 12A of tapered roller 12 is formed, for example, as a straight surface, and what is called a logarithmic crowning profile is provided as being continuous to the straight surface. Therefore, a dimension of a region of contact between rolling surface 12A of tapered roller 12, and inner-ring raceway surface 13A and outer-ring raceway surface 11A (for example, a dimension of a major axis of the contact ellipse) can be long, and consequently skew can be suppressed. Furthermore, variation in position of abutment between inner-ring raceway surface 13A or outer-ring raceway surface 11A and rolling surface 12A can be lessened.

With a longer dimension of the region of contact between rolling surface 12A, and inner-ring raceway surface 13A and outer-ring raceway surface 11A (for example, a dimension of the major axis of the contact ellipse) as described above, when the roller is provided with a full crowning profile as in the conventional example, an edge contact pressure may be produced at the end in the direction of the generatrix under such a condition of use that moment load is applied. In tapered roller bearing 10, however, tapered roller 12 is provided with the logarithmic crowning profile and hence production of such an edge contact pressure can be suppressed while a necessary dimension of the region of contact is ensured.

Figure 18:
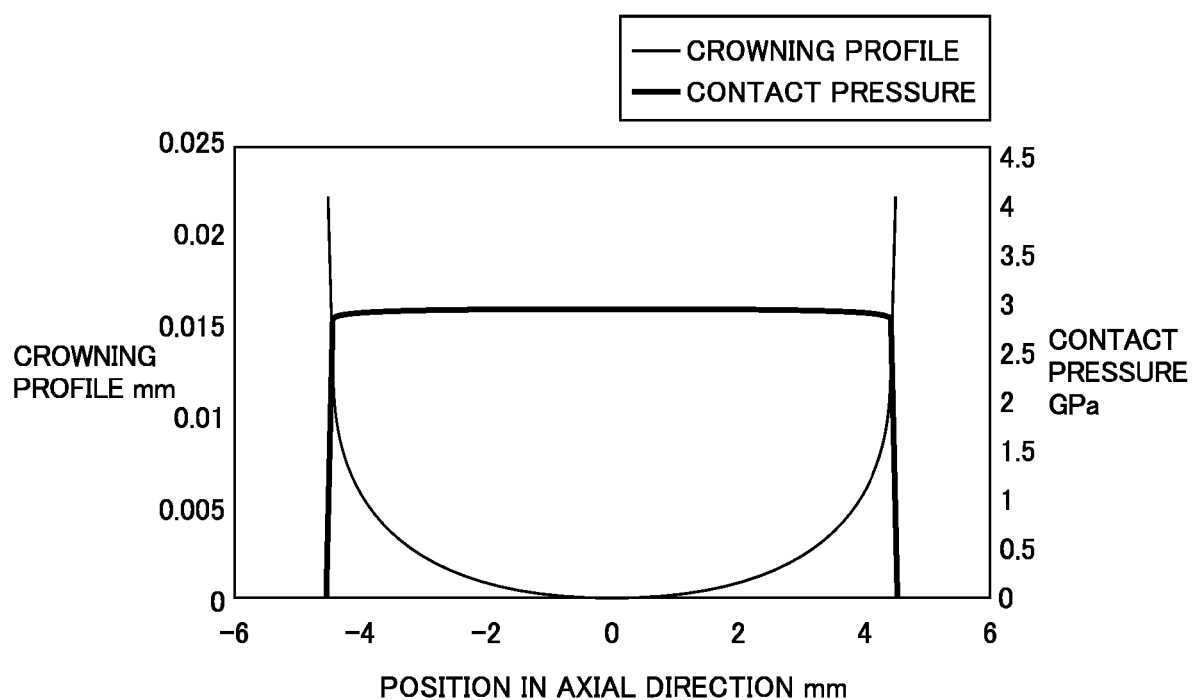
FIG. 18 shows a contour line of a roller provided with a crowning profile of which contour line is expressed by a logarithmic function and a contact surface pressure at a roller rolling surface as being superimposed on each other.
Figure 19:
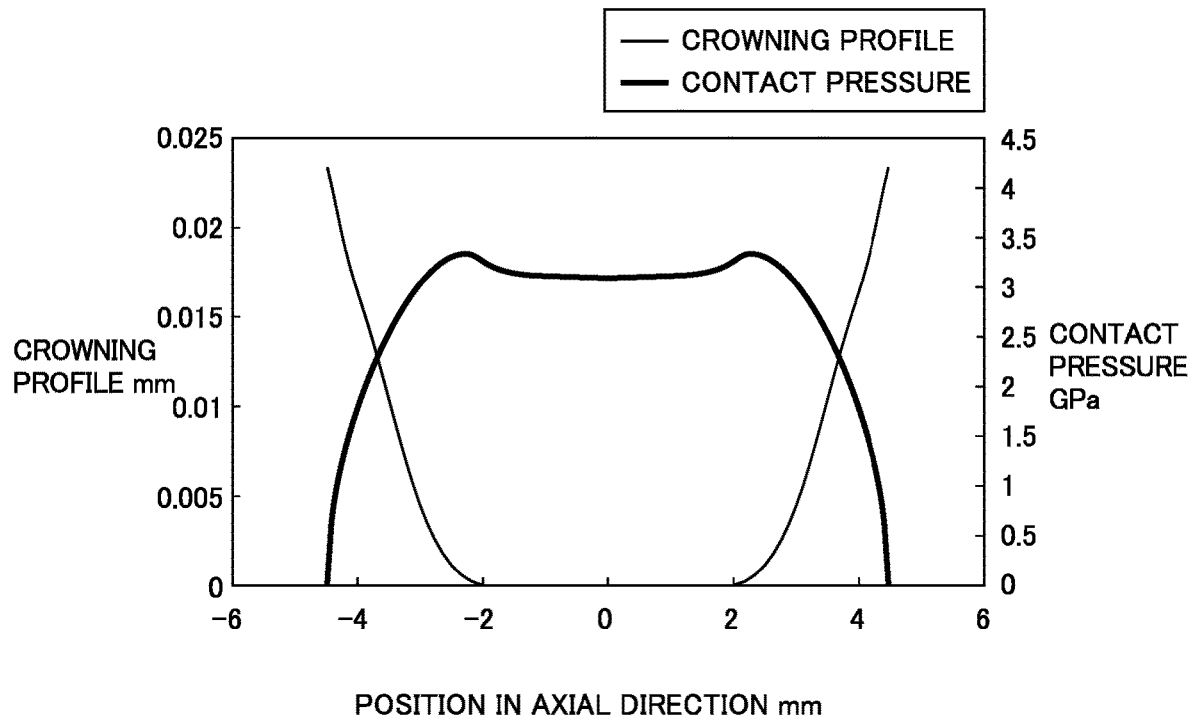
FIG. 19 shows a contour line of a roller in which a portion between a partially arcuate crowning profile and a straight portion is expressed by an auxiliary circular arc and a contact surface pressure at a roller rolling surface as being superimposed on each other.

An effect of the logarithmic crowning profile described above will now be described in more detail. FIG. 18 represents a contour line of a roller provided with a crowning profile with the contour line being represented by a logarithmic function and a contact surface pressure at a roller rolling surface as being superposed on each other. FIG. 19 represents a contour line of a roller with a portion between a partially arcuate crowning profile and a straight portion being represented by an auxiliary circular arc and a contact surface pressure at a roller rolling surface as being superposed on each other. In FIGS. 18 and 19, the ordinate on the left side represents drop (unit: mm) of the crowning profile. In FIGS. 18 and 19, the abscissa represents a position in the axial direction in the roller (unit: mm). In FIGS. 18 and 19, the ordinate on the right side represents a contact surface pressure (unit: GPa).

In an example where a contour line of the rolling surface of the tapered roller is formed in a shape including a partially arcuate crowning profile and a straight portion, even though a gradient at a boundary between the straight portion, the auxiliary circular arc, and the crowning profile is continuous as shown in FIG. 19, the contact surface pressure locally increases when the curvature is discontinuous. Therefore, an oil film may break or a surface may be damaged. Unless a lubricating film having a sufficient thickness is formed, wear due to metal-to-metal contact easily occurs. When the contact surface is partially worn, metal-to-metal contact is more likely in the vicinity thereof, which accelerates wear of the contact surface and leads to damage to the tapered roller.

When the rolling surface of the tapered roller serving as a contact surface is provided with a crowning profile defined by a contour line represented by a logarithmic function as shown, for example, in FIG. 18, a local contact pressure is lower and wear of the contact surface is less likely than in an example where a crowning profile represented by a partial circular arc in FIG. 19 is provided. Therefore, even when lubricant present on the rolling surface of the tapered roller is reduced to a small amount or reduced in viscosity and a lubricating film is reduced in thickness, the contact surface can be prevented from being worn and the tapered roller can be prevented from being damaged. FIGS. 18 and 19 show the contour line of the roller with origin O of the abscissa being set at the central portion of the effective contact portion between the inner ring or the outer ring and the roller in a rectangular coordinate system with the abscissa representing the direction of the generatrix of the roller and the ordinate representing a direction orthogonal to the generatrix and show a contact surface pressure as being superimposed on the former with the contact pressure being represented on the ordinate. Thus, tapered roller bearing 10 exhibiting a long lifetime and high durability can be provided by adopting the construction as described above.

In tapered roller bearing 10, ratio $R_{process}/R$ between actual radius of curvature $R_{process}$ and set radius of curvature R may be equal to or higher than 0.8. When tapered roller bearing 10 is used in an extremely severe lubrication environment, by setting ratio $R_{process}/R$ to 0.8 or higher, the oil film in the portion of contact between larger end face 16 of tapered roller 12 and larger flange surface 18 of inner ring 13 can have a sufficiently large thickness.

In tapered roller bearing 10, arithmetic mean roughness Ra of larger end face 16 of tapered roller 12 may be not greater than 0.10 μm Ra. In this case, the thickness of the oil film in the portion of contact between larger end face 16 of tapered roller 12 and larger flange surface 18 of inner ring 13 can sufficiently be ensured.

Relation between a skew angle of tapered roller 12 and ratio $R/R_{BASE}$ is discussed. Ratio $R/R_{BASE}$ assumes such a condition that larger end face 16 of tapered roller 12 is in a state of contact at a set ideal spherical surface (not including a working error). Table 4 shows relation between ratio $R/R_{BASE}$ and a skew angle of tapered roller 12.

TABLE 4

| Ratio $R/R_{BASE}$ (%) | 1 | 0.95 | 0.9 | 0.85 | 0.8 | 0.75 |
|---|---|---|---|---|---|---|
| Skew Angle | 0 | 0.03 | 0.06 | 0.09 | 0.12 | 0.15 |

As shown in Table 4, as ratio $R/R_{BASE}$ of a roller is lower, a skew angle is larger. Radius of curvature R of larger end face 16 of tapered roller 12 in already described FIG. 4 is a radius of curvature at the time when larger end face 16 is defined by an ideal spherical surface, and larger end face 16 is defined by an ideal single arcuate curve that satisfies a condition of R152=R364=R1564 as shown in FIG. 5. In actual, however, as shown in FIG. 6, larger end face 16 of tapered roller 12 is not defined by a part of one spherical surface around the apex of the cone angle of tapered roller 12. As shown in FIG. 6, R152 on one side is not equal to R1564 of the entire larger end face 16 but smaller than R1564.

When opposing end faces of larger end face 16 of tapered roller 12 sag as shown in FIG. 6, larger end face 16 and larger flange surface 18 of inner ring 13 come in contact with each other only on one side (projection 16A) of larger end face 16. Therefore, a mathematical R dimension of larger end face 16 is set to R152 (actual radius of curvature $R_{process}$ in FIG. 6) and is smaller than the ideal R dimension (set radius of curvature R) (ratio $R_{process}/R$ is lower). Consequently, a contact surface pressure between larger flange surface 18 and larger end face 16 increases and at the same time the skew angle also increases. With increase in skew angle, the contact ellipse produced at the portion of contact between tapered roller 12 and larger flange surface 18 extends out of larger flange surface 18, which leads to break of the oil film and consequently to galling or seizure.

In an environment where a lubrication state is insufficient, as the skew angle of tapered roller 12 increases and additionally the contact surface pressure in the portion of contact between larger flange surface 18 and larger end face 16 increases, a parameter Λ of the oil film between tapered roller 12 and larger flange surface 18 is lowered. As oil film parameter Λ is lower than 1, a state of boundary lubrication in which metal-to-metal contact starts is set. Consequently, wear starts to occur in the portion of contact between larger end face 16 of tapered roller 12 and larger flange surface 18 of the inner ring. As this state continues, wear further progresses and concern about seizure grows.

Oil film parameter Λ is defined as "a ratio between an oil film thickness h and composite roughness σ of root mean roughness of a larger end face of a roller and a larger flange surface of an inner ring found based on elastohydrodynamic lubrication theory." In other words, oil film parameter Λ is expressed as Λ=h/σ. Arithmetic mean roughness Ra and root mean roughness Rq generally satisfy relation of Rq=1.25 Ra. Composite roughness a can be expressed as $\sigma=\sqrt{((Rq_1^2+Rq_2^2)/2)}$ by using Rq, where $Rq_1$ represents root mean roughness of the larger end face of the roller and $Rq_2$ represents root mean roughness of the larger flange surface.

Oil film parameter Λ is dependent on composite roughness a, and the oil film thickness can be larger as a value of a is smaller. Therefore, surface roughness of larger end face 16 of tapered roller 12 and larger flange surface 18 of inner ring 13 is comparable to superfinishing, and the value of σ is desirably not greater than 0.09 μm Rq.

Based on a result of studies about influence by a difference between set radius of curvature R and the radius of curvature of the larger end face of the tapered roller (actual radius of curvature $R_{process}$) in grinding described above, attention was paid to a ratio between actual radius of curvature $R_{process}$ and set radius of curvature R and relation with a contact surface pressure between the larger end face and the larger flange surface, an oil film thickness, a skew angle, and an oil film parameter was verified. Furthermore, a severity level of a lubrication state at the time when a temperature of use of lubricating oil between the larger flange surface of the inner ring and the larger end face of the tapered roller that come in sliding contact with each other attained to the peak was found to affect verification of a practical range of the ratio between actual radius of curvature $R_{process}$ and set radius of curvature R.

Therefore, an indicator indicating the severity level of the lubrication state at the time when the temperature of use of lubricating oil between the larger flange surface of the inner ring and the larger end face of the tapered roller attained to the peak is discussed as below.

(1) Attention was paid to the fact that the lubrication state between the larger flange surface of the inner ring and the larger end face of the tapered roller was determined by a radius of curvature (actual radius of curvature $R_{process}$) of the larger end face of the tapered roller and a temperature of use of lubricating oil.

(2) Attention was paid to viscosity of lubricating oil used, the lubricating oil being assumed to be used in such applications as a transmission and a differential gear, and studies were conducted in consideration also of practical use.

(3) An extremely severe temperature condition that continued for three minutes (180 seconds) at 120° C. was assumed as a maximum condition at the time when the temperature of use of lubricating oil attained to the peak. This temperature condition refers to the maximum condition at the time when the temperature attains to the peak, and means that the state returns to a steady state after lapse of approximately three minutes. This temperature condition is herein referred to as the "assumed peak temperature condition." It was found that a threshold value for setting a ratio between actual radius of curvature $R_{process}$ and set radius of curvature R at which abrupt increase in temperature did not occur in the lubrication state set with viscosity characteristics of lubricating oil being incorporated in the "assumed peak temperature condition" could be calculated.

Based on the finding above, it was conceived that the indicator indicating the severity level of the lubrication state could be calculated in an expression below based on the lubrication state set with viscosity of lubricating oil being incorporated in the "assumed peak temperature condition." This indicator is herein referred to as a "flange lubrication coefficient."

"Flange lubrication coefficient"=viscosity at 120° C.×(oil film thickness$h$)²/180 seconds Oil film thickness h can be calculated, for example, based on the Karna expression below.

[Expression3]

$$h = 1.64 \times 10^{-3} (\eta_0 \bar{u})^{0.74} R_x^{0.41} w^{-0.074} \quad (2)$$

$R_x$: equivalent radius of curvature in direction of motion
$\bar{u}$: average velocity
w: load
$\eta_0$: viscosity at normal atmospheric pressure The "flange lubrication coefficient" set here can be defined as an absolute evaluation indicator value with which the limit of lubrication of a flange of a tapered roller bearing can be found. In use under a condition different from the above in automobile applications or use in applications other than automobiles, the "flange lubrication coefficient" can be calculated with a highest temperature, viscosity, or an assumed peak temperature condition of lubricating oil being varied as appropriate, and compared with a threshold value which will be described later, to thereby determine severity of the lubrication state. Even though the larger flange surface of the inner ring is not substantially linear as in the present invention but curved (recessed in the center), by deriving the "flange lubrication coefficient" from an oil film thickness calculated based on a combined geometry constituted of the curved larger flange surface of the inner ring and the larger end face of the roller, the flange lubrication coefficient can be compared with the threshold value which will be described later and determined. The "flange lubrication coefficient" herein is an indicator value for evaluating severity of the lubrication state of the tapered roller bearing represented as absolute evaluation based on a condition of use of the oil film thickness. The present inventor has derived a new concept of defining a ratio between an optimal radius of curvature and an actual radius of curvature after working of the larger end face of the tapered roller for improving seizure resistance of the tapered roller bearing. In optimizing the ratio, the present inventor has introduced the "flange lubrication coefficient" allowing absolute evaluation in actual use as described previously and made evaluation. Based on this evaluation, definition of the ratio contributing to improvement in seizure resistance of the tapered roller bearing without limitation of applications can be generalized and derived.

A tapered roller bearing according to a modification of the first embodiment of the present invention will now be described. The tapered roller bearing according to the modification of the present first embodiment is different from a general tapered roller bearing in that it is used at a slightly relaxed severity level of a lubrication state set with viscosity characteristics of lubricating oil being incorporated in the "assumed peak temperature condition" and a practical range of the ratio between actual radius of curvature $R_{process}$ and that set radius of curvature R of the larger end face of the tapered roller is expanded. Since the tapered roller bearing is otherwise the same in construction and technical contents as the tapered roller bearing according to the first embodiment described above, all contents in the description of the tapered roller bearing according to the first embodiment described above are applied mutatis mutandis and only differences will be described.

For the tapered roller bearing according to the modification of the present first embodiment, gear oil SAE 75W-90 often used for a differential gear is employed as a sample and the "flange lubrication coefficient" is calculated. Viscosity at 120° C. of 75W-90 is 10.3 cSt (=10.3 mm²/s) and oil film thickness h calculated based on the expression (2) for each value of the ratio between actual radius of curvature $R_{process}$ and set radius of curvature R is as shown in Table 5.

TABLE 5

| Ratio $R_{process}/R$ Between Actual Radius of Curvature $R_{process}$ and Set Radius of Curvature R | 0.4 | 0.5 | 0.7 | 0.8 | 0.9 | 1.0 |
|---|---|---|---|---|---|---|
| Oil Film Thickness h (×10⁻⁴ mm) | 4.419 | 4.999 | 5.725 | 5.983 | 6.137 | 6.122 |

75W-90 was slightly higher in viscosity at 120° C. than VG32, and the lubrication state set with viscosity characteristics of lubricating oil being incorporated in the "assumed peak temperature condition" was slightly more relaxed than in the first embodiment described above. This lubrication state is herein referred to as a "severe lubrication state."

The tapered roller bearing according to the modification of the first embodiment of the present invention was subjected to a seizure resistance test using a rotary test machine. Test conditions for the seizure resistance test are as below.

<Test Condition>

Applied load: radial load of 4000 N and axial load of 7000 N

The number of revolutions: 7000 min⁻¹

Lubricating oil: SAE 75W-90

Tested bearing: tapered roller bearing (having an inner diameter of ϕ35 mm, an outer diameter of ϕ74 mm, and a width 18 mm)

Table 6 shows results of a contact surface pressure between the larger end face and the larger flange surface, an oil film thickness, a skew angle, an oil film parameter, and the "flange lubrication coefficient" for each value of the ratio between actual radius of curvature $R_{process}$ and set radius of curvature R. Though Table 6 shows each of the contact surface pressure, the oil film thickness, the skew angle, and the oil film parameter as a ratio, a denominator defined as the reference is set to a value at the time when such working that actual radius of curvature $R_{process}$ is equal in dimension to set radius of curvature R can be done and 0 is added to each reference character.

TABLE 6

| Ratio $R_{process}/R$ Between Actual Radius of Curvature $R_{process}$ and Set Radius of Curvature R | 0.4 | 0.5 | 0.7 | 0.8 | 0.9 | 1.0 |
|---|---|---|---|---|---|---|
| Contact Surface Pressure Ratio p/p0 Between Larger End Face and Larger Flange Surface | 2.7 | 2.2 | 1.6 | 1.4 | 1.2 | 1 |
| Oil Film Thickness Ratio h/h0 | 0.72 | 0.82 | 0.94 | 0.98 | 1.00 | 1.00 |
| Skew Angle Ratio ϕ/ϕ0 | 8 | 5 | 3 | 1.5 | 1.2 | 1 |
| Oil Film Parameter Ratio Λ/Λ0 | 0.72 | 0.82 | 0.94 | 0.98 | 1.00 | 1.00 |
| Flange Lubrication Coefficient (×10⁻⁹) | 12.2 | 14.4 | 18.8 | 20.5 | 21.6 | 21.4 |
| Test Result | (1) A | (2) A | (3) A | (4) A | (5) A | (6) A |
| Overall Determination | (1) C | (2) A | (3) A | (4) A | (5) A | (6) A |

Table 7 shows details of test results (1) to (6) and overall determination (1) to (6) in Table 6.

TABLE 7

| Test Result | (1) A No particularly large change was observed. | (2) A Same as left | (3) A Same as left | (4) A Same as left | (5) A Same as left | (6) A Same as left |
|---|---|---|---|---|---|---|
| Overall Determination | (1) C The "flange lubrication coefficient" far exceeded $8 \times 10^{-9}$ and a sufficient oil film was formed, however, the skew angle was large and hence there was a concern about unstable behavior of the roller during rotation of the bearing. Therefore, determination as not good (C was made. | (2) A The skew angle was slightly large, however, the "flange lubrication coefficient" far exceeded $8 \times 10^{-9}$ and a sufficient oil film was formed. Therefore, it was determined that development to abrupt damage would not occur and practical use could be made, and determination as good (A) was made. | (3) A The "flange lubrication coefficient" far exceeded $8 \times 10^{-9}$, a sufficient oil film was formed, the skew angle was also small, and rotation was stable. No problem in continued use was found and determination as good (A) was made. | (4) A Same as left | (5) A Same as left | (6) A Same as left |

It has been concluded from the results in Tables 6 and 7 that, in the "severe lubrication state" where 75W-90 representing gear oil for a differential gear is used, ratio $R_{process}/R$ between actual radius of curvature $R_{process}$ and set radius of curvature R is desirably not lower than 0.5. Therefore, in the present first embodiment, ratio $R_{process}/R$ between actual radius of curvature $R_{process}$ and set radius of curvature R is set to 0.5 or higher. By thus introducing the "flange lubrication coefficient" as an indicator indicating the severity level of the lubrication state, a practical range of the ratio between actual radius of curvature $R_{process}$ and set radius of curvature R can be expanded. Proper bearing specifications can thus be selected depending on a condition of use.

The tapered roller bearing in the present embodiment is not limited to those in applications of the differential gear but is applicable to a transmission or other applications in the "severe lubrication state."

In setting a practical ratio between actual radius of curvature $R_{process}$ and set radius of curvature R, a test for confirmation purpose may be conducted only around a threshold value. A man-hour in design can thus be reduced. In the "severe lubrication state" in Table 6, even when ratio $R_{process}/R$ between actual radius of curvature $R_{process}$ and set radius of curvature R is 0.4, the sufficient "flange lubrication coefficient" is obtained. When ratio $R_{process}/R$ between actual radius of curvature $R_{process}$ and set radius of curvature R is 0.4 in the "severe lubrication state" where lubricating oil slightly lower in viscosity than in Table 6 is employed, however, a threshold value not smaller than $8 \times 10^{-9}$ may not be satisfied and the skew angle is also larger. Therefore, ratio $R_{process}/R$ between actual radius of curvature $R_{process}$ and set radius of curvature R not lower than 0.5 is proper.

For a tapered roller bearing according to another modification of the first embodiment of the present invention, turbine oil ISO viscosity grade VG32 which is lubricating oil often used for a transmission is employed as a sample and the "flange lubrication coefficient" is calculated. Viscosity at 120° C. of VG32 is 7.7 cSt (=7.7 mm²/s) and oil film thickness h is calculated based on the expression (2). For each value of the ratio between actual radius of curvature $R_{process}$ and set radius of curvature R, oil film thickness h is as shown in Table 8.

TABLE 8

| Ratio $R_{process}/R$ Between Actual Radius of Curvature $R_{process}$ and Set Radius of Curvature R | 0.4 | 0.5 | 0.7 | 0.8 | 0.9 | 1.0 |
|---|---|---|---|---|---|---|
| Oil Film Thickness h ($\times 10^{-4}$ mm) | 3.343 | 3.782 | 4.332 | 4.527 | 4.624 | 4.632 |

VG32 was low in viscosity at 120° C., and the lubrication state set with viscosity of lubricating oil being incorporated in the "assumed peak temperature condition" was extremely severe. This lubrication state is herein referred to as an "extremely severe lubrication state."

A seizure resistance test using a rotary test machine was conducted together. Test conditions for the seizure resistance test are as below.

<Test Condition>
Applied load: radial load of 4000 N and axial load of 7000 N
Rotation speed: 7000 min$^{-1}$
Lubricating oil: turbine oil ISO VG32
Tested bearing: tapered roller bearing (having an inner diameter of φ35 mm, an outer diameter of φ74 mm, and a width 18 mm)

Table 9 shows results of a contact surface pressure between the larger end face and the larger flange surface, an oil film thickness, a skew angle, an oil film parameter, and the "flange lubrication coefficient" for each value of the ratio between actual radius of curvature $R_{process}$ and set radius of curvature R. Though Table 9 shows each of the contact surface pressure, the oil film thickness, the skew angle, and the oil film parameter as a ratio, a denominator defined as the reference is set to a value at the time when such working that actual radius of curvature $R_{process}$ is equal in dimension to set radius of curvature R can be done and 0 is added to each reference character.

TABLE 9

| Ratio $R_{process}/R$ Between Actual Radius of Curvature $R_{process}$ and Set Radius of Curvature R | 0.4 | 0.5 | 0.7 | 0.8 | 0.9 | 1.0 |
|---|---|---|---|---|---|---|

TABLE 9-continued

| | | | | | | |
|---|---|---|---|---|---|---|
| Contact Surface Pressure Ratio p/p0 Between Larger End Face and Larger Flange Surface | 2.7 | 2.2 | 1.6 | 1.4 | 1.2 | 1 |
| Oil Film Thickness Ratio h/h0 | 0.72 | 0.82 | 0.94 | 0.98 | 1.00 | 1.00 |
| Skew Angle Ratio $\phi/\phi 0$ | 8 | 5 | 3 | 1.5 | 1.2 | 1 |
| Oil Film Parameter Ratio $\Lambda/\Lambda 0$ | 0.72 | 0.82 | 0.94 | 0.98 | 1.00 | 1.00 |
| Flange Lubrication Coefficient ($\times 10^{-9}$) | 4.78 | 6.12 | 8.03 | 8.77 | 9.14 | 9.18 |
| Test Result | (1) C | (2) B | (3) B | (4) A | (5) A | (6) A |
| Overall Determination | (1) C | (2) C | (3) B | (4) A | (5) A | (6) A |

Table 10 shows details of test results (1) to (6) and overall determination (1) to (6) in Table 9.

TABLE 10

| | (1) C | (2) B | (3) B | (4) A | (5) A | (6) A |
|---|---|---|---|---|---|---|
| Test Result | The temperature abruptly increased. | Strong contact between the roller larger end face and the inner ring larger flange surface was observed. | Same as left | No particularly large change was observed. | Same as left | Same as left |
| Overall Determination | (1) C The "flange lubrication coefficient" was low, contact was strong, and the skew angle was large. Therefore, determination as not good (C) was made. | (2) C The "flange lubrication coefficient" was low, contact was strong, and the skew angle was slightly large. Therefore, there was a concern about unstable behavior of the roller during rotation of the bearing and determination as not good (C) was made. | (3) B The "flange lubrication coefficient" was low and contact was strong, however, the skew angle was approximately small. Therefore, it was determined that immediate development to abrupt damage would not occur and determination as acceptable (B) was made. | (4) A The "flange lubrication coefficient" far exceeded $8 \times 10^{-9}$, a sufficient oil film was formed, the skew angle was also small, and rotation was stable. No problem in continued use was found and determination as good (A) was made. | (5) A Same as left | (6) A Same as left |

It has been concluded from the results in Tables 9 and 10 that, in the "extremely severe lubrication state" where VG32 being low in viscosity and representing transmission oil is used, ratio $R_{process}/R$ between actual radius of curvature $R_{process}$ and set radius of curvature R is desirably not lower than 0.8. Therefore, for the tapered roller bearing according to another modification of the present first embodiment, ratio $R_{process}/R$ between actual radius of curvature $R_{process}$ and set radius of curvature R is set to 0.8 or higher.

The tapered roller bearing described above is not limited to those in the applications of the transmission but is applicable to a differential gear or other applications in the "extremely severe lubrication state."

The following was found based on the results in Tables 9 and 10. As the calculated "flange lubrication coefficient" and the results in the seizure resistance test were checked against each other, practicability could be confirmed by setting ratio $R_{process}/R$ between actual radius of curvature $R_{process}$ and set radius of curvature R such that the "flange lubrication coefficient" exceeded $8 \times 10^{-9}$. The "flange lubrication coefficient"=$8 \times 10^{-9}$ can be adopted as a threshold value for setting practical ratio $R_{process}/R$ between actual radius of curvature $R_{process}$ and set radius of curvature R.

<Method of Manufacturing Tapered Roller Bearing>

Figure 20:
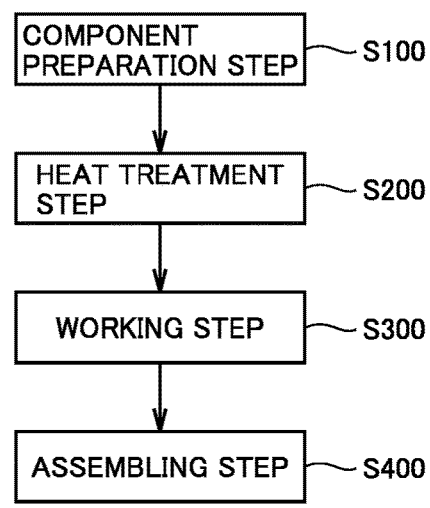
FIG. 20 is a flowchart of a method of manufacturing a tapered roller bearing according to the first embodiment.
Figure 21:
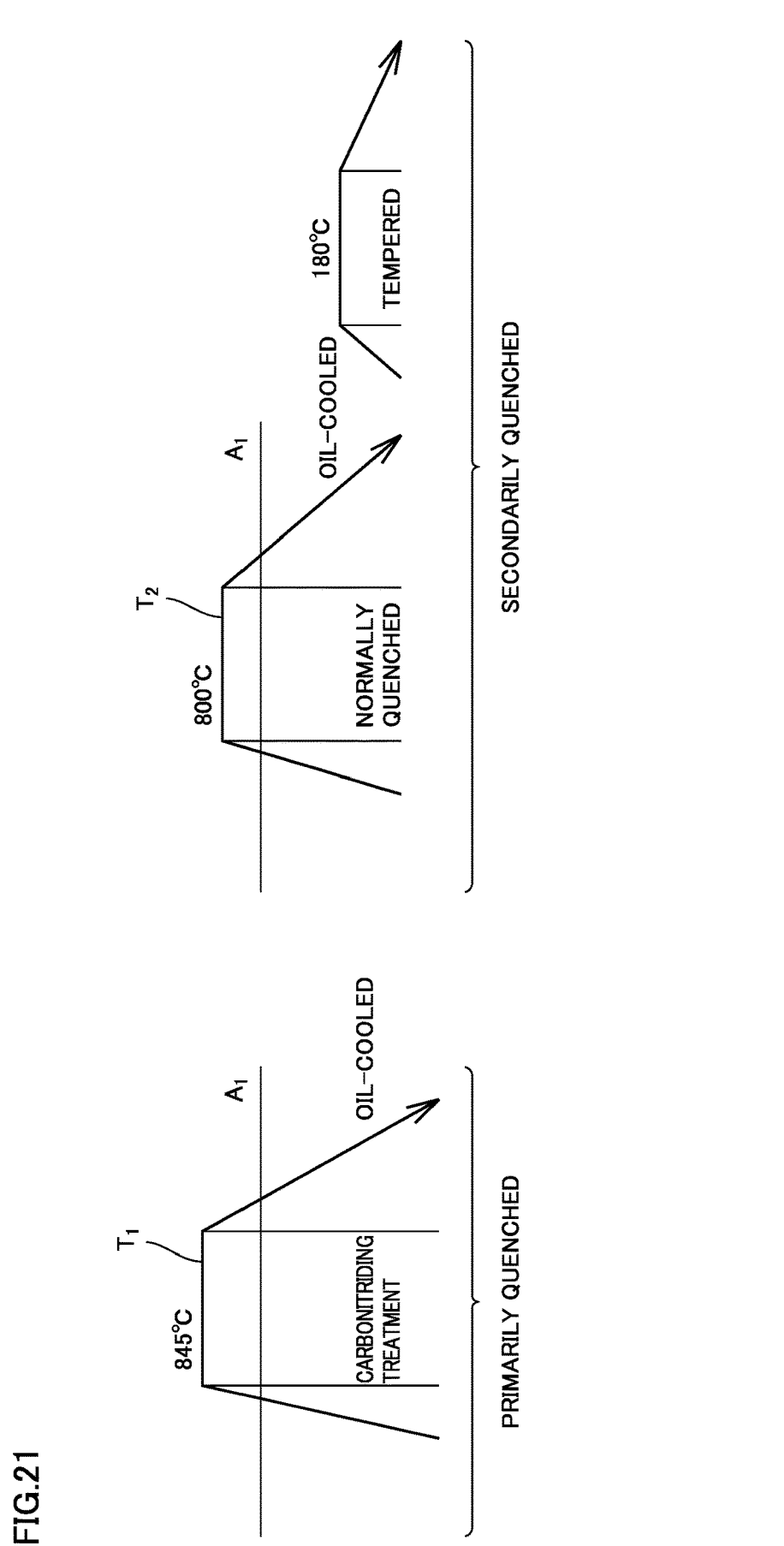
FIG. 21 is a diagram for illustrating a heat treatment method in the first embodiment.
Figure 22:
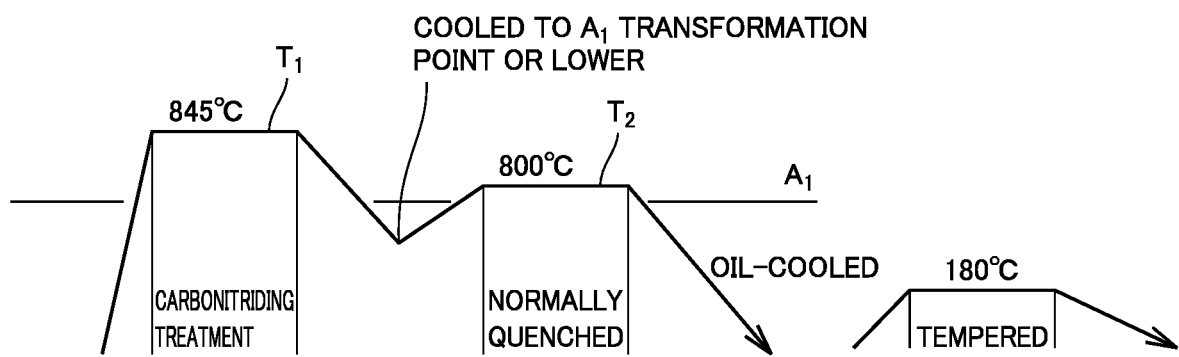
FIG. 22 is a diagram for illustrating a modification to the heat treatment method in the first embodiment.

FIG. 20 is a flowchart for illustrating a method of manufacturing the tapered roller bearing shown in FIG. 1. FIG. 21 is a schematic diagram representing a heat treatment pattern in a heat treatment step in FIG. 20. FIG. 22 is a schematic diagram representing a modification to the heat treatment pattern shown in FIG. 21. A method of manufacturing tapered roller bearing 10 will be described below.

As shown in FIG. 20, initially, a component preparation step (S100) is performed. In this step (S100), members to be bearing components such as outer ring 11, inner ring 13, roller 12, and cage 14 are prepared. A member to be tapered roller 12 is uncrowned, and a surface of the member is yet-to-be-worked surface 12E shown with a dotted line in FIG. 12.

Then, a heat treatment step (S200) is performed. In this step (S200), prescribed heat treatment is performed to control characteristics of the bearing components. For example, in order to form nitrogen enriched layer 11B, 12B, or 13B according to the present embodiment in at least one of outer ring 11, tapered roller 12, and inner ring 13, carbonitriding or nitriding, quenching, tempering, and the like are performed. An exemplary heat treatment pattern in this step (S200) is shown in FIG. 21. FIG. 21 shows a heat treatment pattern representing a method of performing primary quenching and secondary quenching. FIG. 22 shows a heat treatment pattern representing a method in which a material is cooled to a temperature lower than an $A_1$ transformation point during quenching and thereafter the material is reheated and finally quenched. In these figures, in treatment $T_1$, carbon, nitrogen, and the like are diffused through a steel matrix and carbon is sufficiently dissolved therein, and thereafter the material is cooled to a temperature lower than the $A_1$ transformation point. Then, in treatment $T_2$ in the figure, the material is reheated to a temperature lower than in treatment $T_1$ and oil-quenched. Thereafter, the material is tempered, for example, at a heating temperature of 180° C.

According to the heat treatment, as compared with ordinary quenching, that is, carbonitriding treatment followed by quenching once, cracking strength can be improved and a rate of change in dimension over time can be lowered while a surface layer portion of a bearing component is carbonitrided. According to the heat treatment step (S200), such a microstructure as shown in FIG. 7 that a grain size of prior austenite crystal grains is not greater than ½ of that in a microstructure in the conventional quenched structure shown in FIG. 8 can be obtained in nitrogen enriched layers 11B, 12B, and 13B having a quenched structure. The bearing component subjected to the above heat treatment has a long life against rolling fatigue and increased cracking strength, and can also achieve a reduced rate of change in dimension over time.

Then, a working step (S300) is performed. In this step (S300), the material is finished to have a final shape of each bearing component. Tapered roller 12 is provided with crowning profile 22A and chamfered portion 21 by machining such as cutting, as shown in FIG. 12.

Then, an assembling step (S400) is performed. In this step (S400), tapered roller bearing 10 shown in FIG. 1 is obtained by assembling the bearing components prepared as described above. Thus, tapered roller bearing 10 shown in FIG. 1 can be manufactured.

<Exemplary Application of Tapered Roller Bearing>

Figure 23:
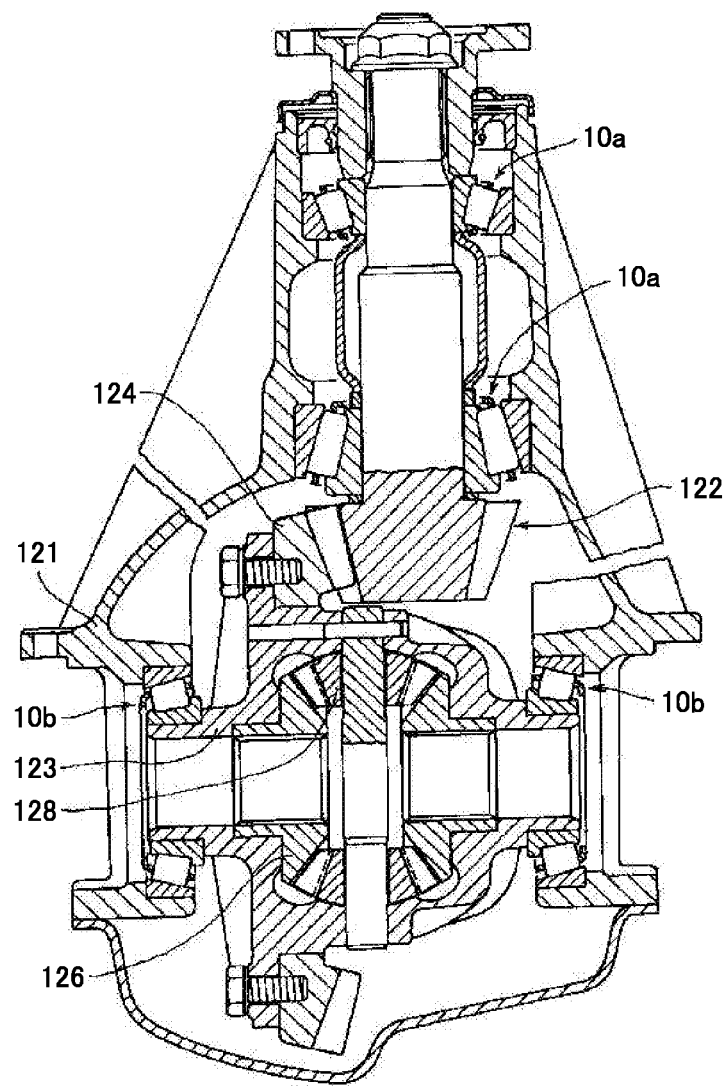
FIG. 23 is a vertical cross-sectional view of a differential gear including the tapered roller bearing according to the first embodiment.

An exemplary application of the tapered roller bearing according to the present first embodiment will now be described. The tapered roller bearing according to the present embodiment is suitably incorporated in a powertrain of an automobile such as a differential gear or a transmission. The tapered roller bearing according to the present embodiment is suitably used as a tapered roller bearing for an automobile. FIG. 23 shows a differential gear of an automobile including tapered roller bearing 10 described above. The differential gear is such that a drive pinion 122 coupled to a propeller shaft (not shown) and inserted through a differential case 121 is meshed with a ring gear 124 attached to a differential gear case 123 and a pinion gear 125 attached inside differential gear case 123 is meshed with a side gear 126 coupled to a drive shaft (not shown) inserted through differential gear case 123 from right and left sides so that driving force from an engine is transmitted from the propeller shaft to the left and right drive shafts. In this differential gear, drive pinion 122 serving as a power transmission shaft and differential gear case 123 are supported by a pair of tapered roller bearings 10a and a pair of tapered roller bearings 10b, respectively.

In transmissions, differential gears, or the like which are powertrains for automobiles, viscosity of lubricating oil (oil) is lowered or an amount of oil tends to be reduced for enhanced fuel economy, and formation of a sufficient oil film in a tapered roller bearing may be less likely. Therefore, tapered roller bearings for automobiles are required to achieve longer life. The requirement can be satisfied by incorporating tapered roller bearing 10 achieving longer life into a transmission or a differential gear.

Second Embodiment

A second embodiment of the present invention will be described below with reference to the drawings. The same or corresponding elements in the drawings below have the same reference characters allotted and description thereof will not be repeated.

<Construction of Tapered Roller Bearing>

Figure 24:
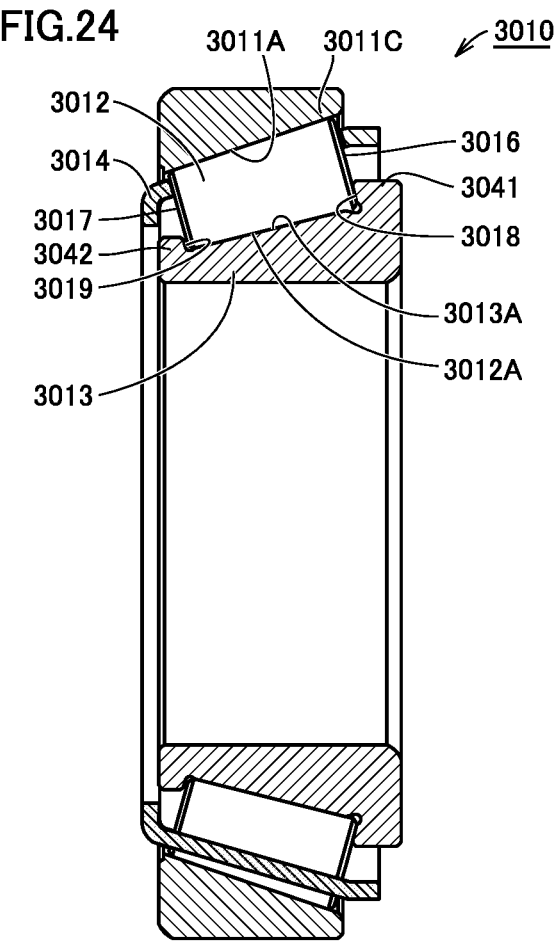
FIG. 24 is a schematic cross-sectional view showing a tapered roller bearing according to a second embodiment.
Figure 25:
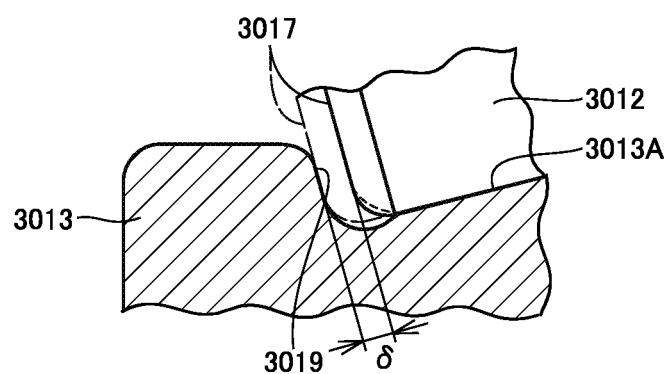
FIG. 25 is an enlarged cross-sectional view of a main portion in FIG. 24.
Figure 26:
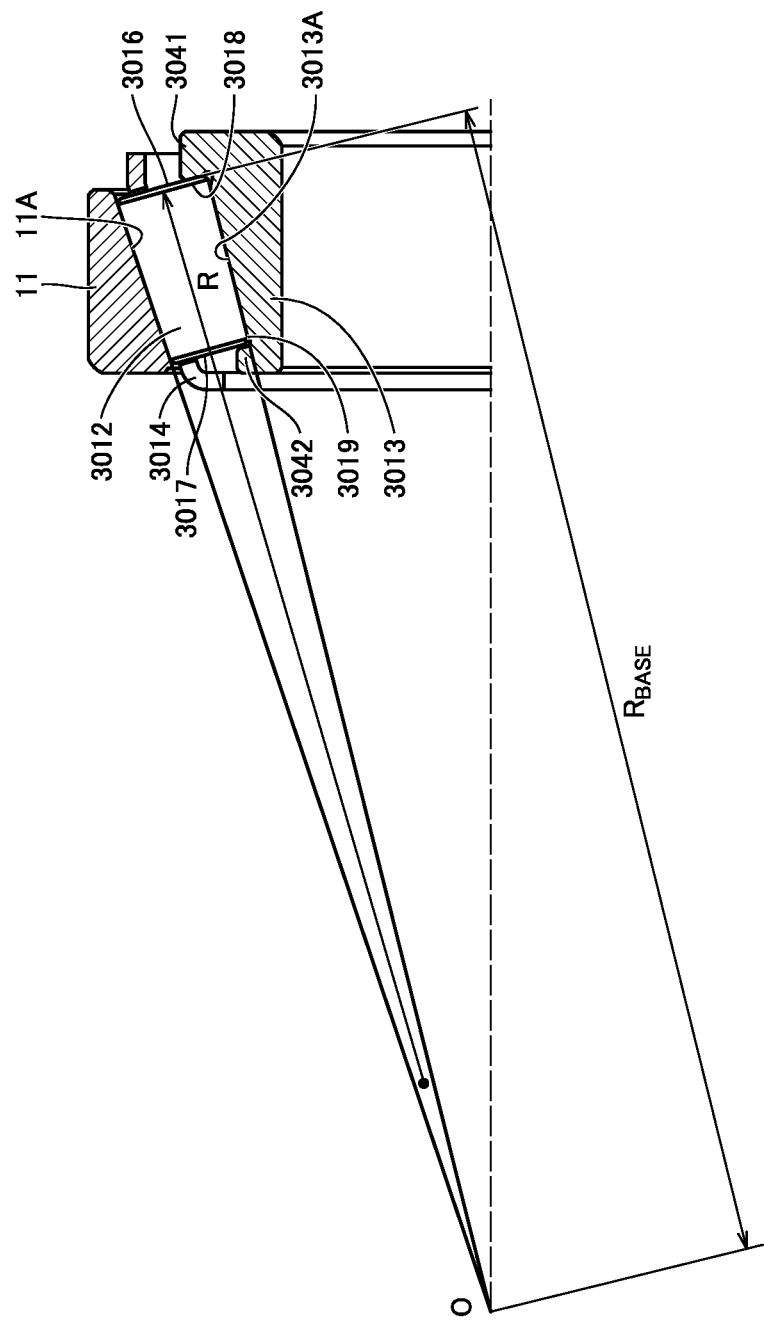
FIG. 26 is a schematic cross-sectional view showing design specifications of the tapered roller bearing according to the second embodiment.

FIG. 24 is a schematic cross-sectional view of a tapered roller bearing according to the second embodiment of the present invention. FIG. 25 is a cross-sectional view showing as being enlarged, in particular a region where a smaller end face 3017 and a smaller flange surface 3019 are arranged and a region around the same in a tapered roller shown in FIG. 24. FIG. 26 is a schematic cross-sectional view showing design specifications of the tapered roller bearing shown in FIG. 24. The tapered roller bearing according to the present second embodiment will be described with reference to FIGS. 24 to 26.

A tapered roller bearing 3010 shown in FIG. 24 mainly includes an outer ring 3011, an inner ring 3013, a plurality of tapered rollers (which may also simply be called a roller below) 3012, and a cage 3014. Outer ring 3011 has an annular shape, and includes an outer-ring raceway surface 3011A around its inner circumferential surface. Inner ring 3013 has an annular shape, and includes an inner-ring raceway surface 3013A around its outer circumferential surface. Inner ring 3013 is arranged on an inner circumferential side of outer ring 3011 such that inner-ring raceway surface 3013A faces outer-ring raceway surface 3011A. In the description below, a direction along a central axis of tapered roller bearing 3010 is referred to as an "axial direction," a direction orthogonal to the central axis is referred to as a "radial direction," and a direction along a circular arc around the central axis is referred to as a "circumferential direction."

Rollers 3012 are arranged on the inner circumferential surface of outer ring 3011. Roller 3012 has a roller rolling surface 3012A as a rolling surface and comes in contact with inner-ring raceway surface 3013A and outer-ring raceway surface 3011A at roller rolling surface 3012A. The plurality of rollers 3012 are disposed between outer-ring raceway surface 3011A and inner-ring raceway surface 3013A. The plurality of rollers 3012 are arranged at prescribed pitches in the circumferential direction in cage 3014 made of a metal. Thus, roller 3012 is held on the annular raceway of outer ring 3011 and inner ring 3013 in a rollable manner. Tapered roller bearing 3010 is constructed such that the apex of a cone including outer-ring raceway surface 3011A, the apex of a cone including inner-ring raceway surface 3013A, and the apex of a cone including the locus of the rotation axis of roller 3012 when the roller rolls meet at one point (point O in FIG. 26) on the centerline of the bearing. According to such a construction, outer ring 3011 and inner ring 3013 of tapered roller bearing 3010 are rotatable relative to each other. Cage 3014 is not limited to a cage made of a metal and may be made of a resin.

Outer ring 3011, inner ring 3013, and roller 3012 are preferably made, for example, of high-carbon chromium bearing steel defined under JIS, and more specifically SUJ2 defined under JIS.

Referring to the enlarged view in FIG. 25, smaller flange surface 3019 of inner ring 3013 is finished to a ground surface in parallel to smaller end face 3017 of roller 3012 and in surface contact with smaller end face 3017 of roller 3012 in an initial assembled state shown with a chain dotted line in the figure. Smaller end face 3017 is distant from smaller flange surface 3019 of roller 3012. A gap δ between smaller flange surface 3019 of inner ring 3013 and smaller end face 3017 of roller 3012 provided while roller 3012 shown with a solid line is set in place, that is, while a larger end face 3016 of roller 3012 is in contact with a larger flange surface 3018 of inner ring 3013, is within a restricted dimension range defined as δ≤0.4 mm. Thus, the number of rotations required until roller 3012 is set in place in running-in can be decreased and a running-in period can be shorter. Larger flange surface 3018 is arranged on a larger diameter side relative to inner-ring raceway surface 3013A and in contact with larger end face 3016.

The contact surface between the rolling surface of roller 3012 and inner-ring raceway surface 3013A preferably has a straight portion.

Ratio $R/R_{BASE}$ Between Radius of Curvature R of Larger End Face 3016 of Tapered Roller 3012 and Distance $R_{BASE}$ from Point O to Larger Flange Surface 3018 of Inner Ring 3013:

As shown in FIG. 26, apexes of cone angles of tapered roller 3012 and raceway surfaces 3011A and 13A of outer ring 3011 and inner ring 3013 meet at one point O on the centerline of tapered roller bearing 3010. A value of ratio $R/R_{BASE}$ between radius of curvature (which is also called set radius of curvature) R of larger end face 3016 of tapered roller 3012 and distance $R_{BASE}$ from point O to larger flange surface 3018 of inner ring 3013 is not smaller than 0.75 and not greater than 0.87.

Shape of Larger End Face 3016 of Tapered Roller 3012:

Ratio $R_{process}/R$ between actual radius of curvature $R_{process}$ and set radius of curvature R is not lower than 0.5, where $R_{process}$ represents an actual radius of curvature after grinding of larger end face 3016 of tapered roller 3012. The ratio may be not lower than 0.8. Since specific description is the same as in the first embodiment described previously, it is not provided.

Figure 27:
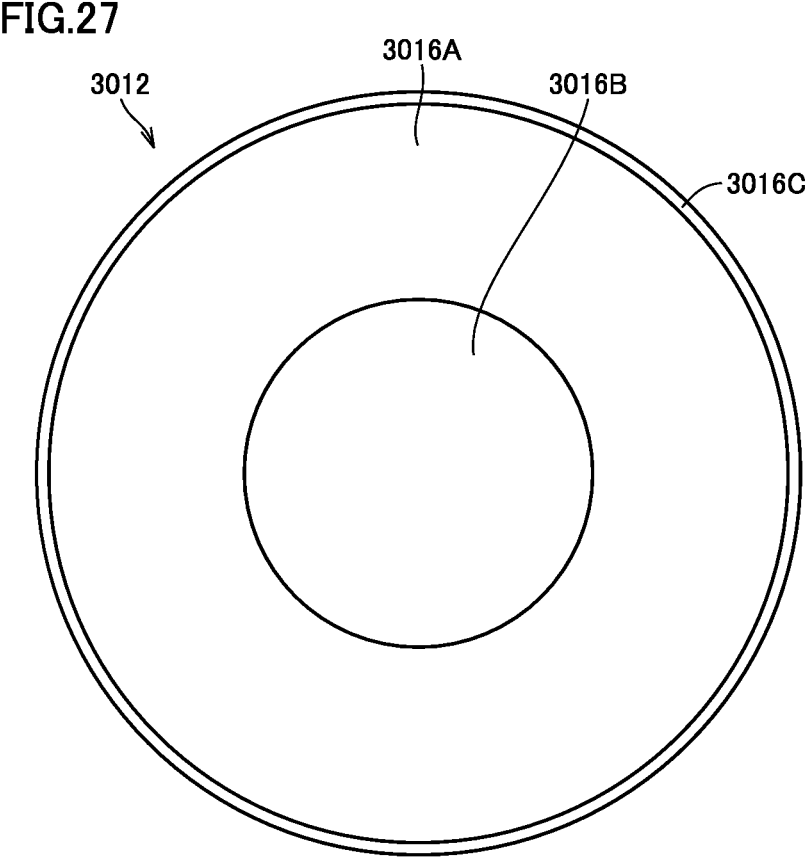
FIG. 27 is a schematic plan view showing a larger end face of a tapered roller of the tapered roller bearing according to the second embodiment.

Arithmetic Mean Roughness (Surface Roughness) of Larger End Face 3016 of Tapered Roller 3012:

Arithmetic mean roughness Ra of larger end face 3016 may be not greater than 0.10 μm Ra. Description will be given below with reference to FIG. 27. FIG. 27 is a schematic plan view showing larger end face 3016 of tapered roller 3012. As shown in FIG. 27, larger end face 3016 includes a chamfered portion 3016C, a projection 3016A, and a recess 3016B. In larger end face 3016, chamfered portion 3016C is arranged around an outermost circumference. Annular projection 3016A is arranged on the inner circumferential side of chamfered portion 3016C. Recess 3016B is arranged on the inner circumferential side of projection 3016A. Projection 3016A is a surface that projects relative to recess 3016B. Chamfered portion 3016C is formed to connect projection 3016A to the rolling surface which is a side surface of tapered roller 3012. Arithmetic mean roughness Ra of larger end face 3016 described above substantially means arithmetic mean roughness of projection 3016A. In larger end face 3016 of tapered roller 3012, a difference between a maximum value and a minimum value of arithmetic mean roughness Ra of projection 3016A which is an annular surface region in contact with larger flange surface 3018 is not greater than 0.02 μm Ra.

Larger flange surface 3018 is ground to arithmetic mean roughness, for example, not greater than 0.12 μm Ra. Preferably, the larger flange surface has arithmetic mean roughness Ra not greater than 0.063 μm Ra.

In tapered roller bearing 3010 in the present second embodiment, arithmetic mean roughness Ra of larger flange surface 3018 is not smaller than 0.1 μm Ra and not greater than 0.2 μm Ra, skewness Rsk of a roughness profile of larger flange surface 3018 is not smaller than −1.0 and not greater than −0.3, and kurtosis Rku of the roughness profile of larger flange surface 3018 is not smaller than 3.0 and not greater than 5.0. Skewness Rsk of the roughness profile refers to skewness Rsk of a roughness profile defined under 4.2.3 of the Japanese Industrial Standards (JIS) B0601:2013, and kurtosis Rku of the roughness profile refers to kurtosis Rku of the roughness profile defined under 4.2.4 of the Japanese Industrial Standards (JIS) B0601:2013.

In order to stabilize rotational torque under a condition of rotation of outer ring 3011 or inner ring 3013 of tapered roller bearing 3010 at a low speed, that is, within a range of the number of rotations not more than 200 r/min., arithmetic mean roughness Ra of larger flange surface 3018 is not smaller than 0.1 μm Ra and not greater than 0.2 μm Ra.

Skewness Rsk of the roughness profile is defined as a quotient of the mean cube value of ordinate values z(x) and the cube of a root mean square deviation of primary profile Rq within a sampling length as shown in an expression (3) below. Skewness Rsk of the roughness profile is expressed as a numeric value representing measures of asymmetry of a probability density function of a profile, and it is a parameter strongly affected by a projecting peak or valley.

[Expression 4]

$$Rsk = \frac{1}{Rq^3}\left[\frac{1}{l}\int_0^l z^3(x)dx\right] \qquad (3)$$

Figure 28:
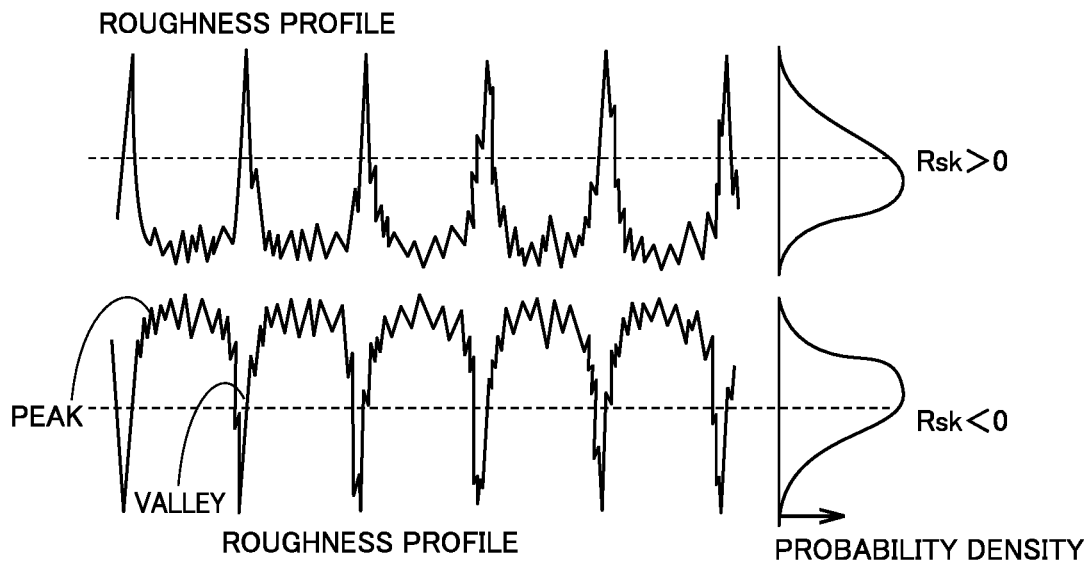
FIG. 28 shows a roughness profile representing skewness Rsk of the larger flange surface in the present second embodiment.

FIG. 28 shows a roughness profile which satisfies relation of skewness Rsk>0 and a roughness profile which satisfies relation of skewness Rsk<0.

As is clear from comparison between these roughness profiles, when relation of skewness Rsk>0 is satisfied, there are a number of peaks steeply projecting upward on the sheet plane in FIG. 28, and in such a case, seizure resistance of larger flange surface 3018 may significantly be poorer than that in an example of roughness at a superfinishing level. When relation of skewness Rsk<0 is satisfied, however, a surface profile is such that pointed peaks steeply projecting upward on the sheet plane in FIG. 28 tend to relatively be fewer and hence break of an oil film is less likely, which is advantageous for prevention of seizure. As a negative value of skewness Rsk is greater, a width of the valley is larger in a lateral direction over the sheet plane in FIG. 28, and a surface (larger flange surface 3018 of inner ring 3013 in contact with larger end face 3016 of roller 3012 in tapered roller bearing 3010) at which the number of projecting and pointed peaks is relatively small is smaller in width. Since stress is thus concentrated to a boundary portion between the surface and the valley, formation of an oil film is interfered. By setting skewness Rsk of the roughness profile of larger flange surface 3018 of inner ring 3013 to be not smaller than −1.0 and not greater than −0.3, larger flange surface 3018 has such a characteristic as having a smooth plane including relatively few projecting and pointed peaks in the direction of width of FIG. 28 and has a surface profile advantageous in formation of an oil film.

As shown on the right in FIG. 28, a probability density function of Rsk is located unevenly above an average line shown with a dotted line in the figure as extending laterally when the condition of Rsk<0 is satisfied. Therefore, by satisfying relation of Rsk<0 and in particular by setting Rsk to be not smaller than −1.0 and not greater than −0.3, larger flange surface 3018 has a profile having gentle peaks over a wide range.

Kurtosis Rku of a roughness profile is defined as a quotient of the mean quartic value of ordinate values z(x) and the fourth power of root mean square deviation Rq of the primary profile within a sampling length as shown in an expression (4) below. Kurtosis Rku of the roughness profile is expressed as a numeric value representing measures of pointedness (sharpness) of a probability density function of a profile, and it is a parameter strongly affected by a projecting peak or valley.

[Expression 5]

$$Rku = \frac{1}{Rq^4}\left[\frac{1}{l}\int_0^l z^4(x)dx\right] \quad (4)$$

Figure 29:
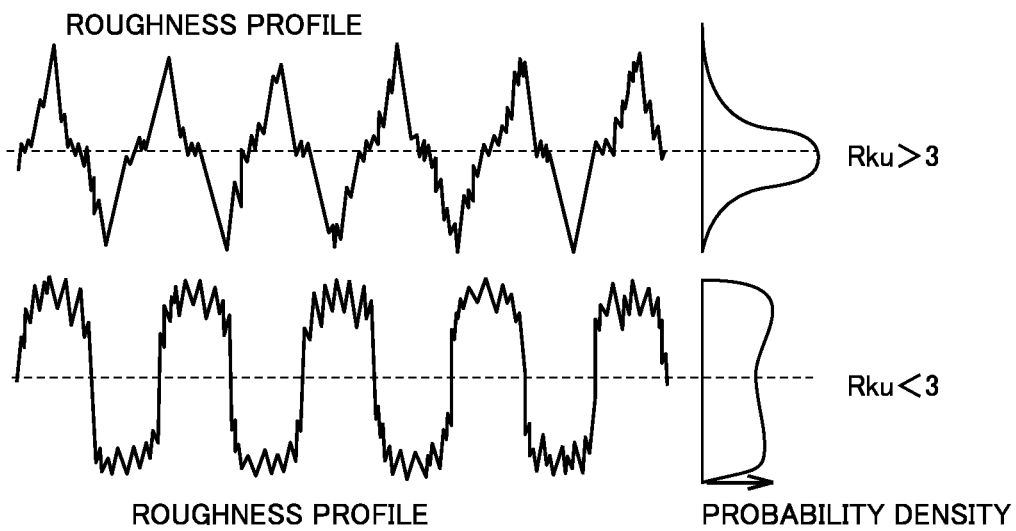
FIG. 29 shows a roughness profile representing kurtosis Rku of the larger flange surface in the present second embodiment.

FIG. 29 shows a roughness profile which satisfies relation of kurtosis Rku>3 and a roughness profile which satisfies relation of kurtosis Rku<3.

As is clear from comparison between these roughness profiles, when relation of kurtosis Rku<3 is satisfied, there are few pointed and steeply projecting peaks or valleys in the profile, and in such a case, rotational torque may not be stable. When relation of kurtosis Rku>3 is satisfied, however, there tend to be more peaks and valleys pointed and relatively steeply projecting upward and downward in the figure. Thus, larger flange surface 3018 can moderately come in contact with a metal, which is advantageous in stabilization of rotational torque of tapered roller bearing 3010. When a positive value of kurtosis Rku is excessively large, however, excessive contact of larger flange surface 3018 with a metal occurs and seizure resistance is lowered. By setting kurtosis Rku of the roughness profile of larger flange surface 3018 of inner ring 3013 to be not smaller than 3.0 and not greater than 5.0, larger flange surface 3018 has such a surface texture as a protrusion with roughness for achieving stabilization of rotational torque in rotation at a low speed.

In the present second embodiment, skewness Rsk of the roughness profile of larger end face 3016 of tapered roller 3012 is not smaller than 2 and not greater than 7 and kurtosis Rku of the roughness profile of larger end face 3016 is not smaller than −1 and not greater than 1. When larger flange surface 3018 is in a shape of a generatrix with projections and recesses, a maximum value of a height of the projections and recesses of larger flange surface 3018 is preferably not greater than 1 µm.

Shape of Rolling Surface of Tapered Roller 3012:

Rolling surface 3012A (see FIG. 24) of roller 3012 includes crowned portions 3022 and 3024 located at opposing ends and a central portion 3023 connecting crowned portions 3022 and 3024 to each other. Central portion 3023 is uncrowned and linear in a cross section in a direction along a centerline 3026 representing the rotation axis of roller 3012. A chamfered portion 3021 is formed between smaller end face 3017 of roller 3012 and crowned portion 3022. A chamfered portion 3016C is also formed between larger end face 3016 of roller 3012 and crowned portion 24.

Figure 30:
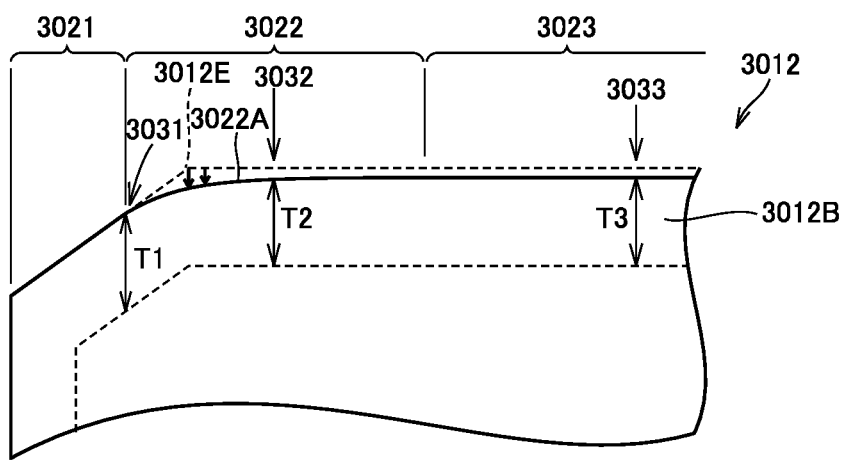
FIG. 30 is a diagram for illustrating a logarithmic crowning profile of the roller of the tapered roller bearing according to the second embodiment.

In a method of manufacturing roller 3012, in treatment for forming nitrogen enriched layer 3012B (carbonitriding treatment), roller 3012 is not crowned but an outer geometry of roller 3012 is a yet-to-be-worked surface 3012E shown with a dotted line in FIG. 30. After the nitrogen enriched layer is formed in this state, roller 3012 has a side surface worked as shown with an arrow in FIG. 30 as finishing so that crowned portions 3022 and 3024 are obtained as shown in FIG. 26.

Crowning Profile:

A crowning profile formed in a contact area crowned portion 3027 included in crowned portions 3022 and 3024 of roller 3012 (which is a portion continuous to central portion 3023 and in contact with inner-ring raceway surface 3013A) is defined as below. Specifically, a sum of crown drops is expressed in a y-z coordinate system with a generatrix of rolling surface 3012A of roller 3012 being defined as the y axis and a direction orthogonal to the generatrix being defined as the z axis, by the expression (1) where $K_1$, $K_2$, and $z_m$ represent design parameters, Q represents a load, L represents a length of an effective contact portion of rolling surface 3012A of roller 3012 along the generatrix, E' represents an equivalent elastic modulus, a represents a length from an origin on the generatrix of the rolling surface of roller 3012 to an end of the effective contact portion, and A is defined as $A=2K_1Q/\pi LE'$.

[Expression 6]

$$z(y) = A\ln\frac{1}{1-\{1-\exp(-\frac{z_m}{A})\}(\frac{y-a}{K_2 a}+1)^2} \quad (1)$$

Figure 31:
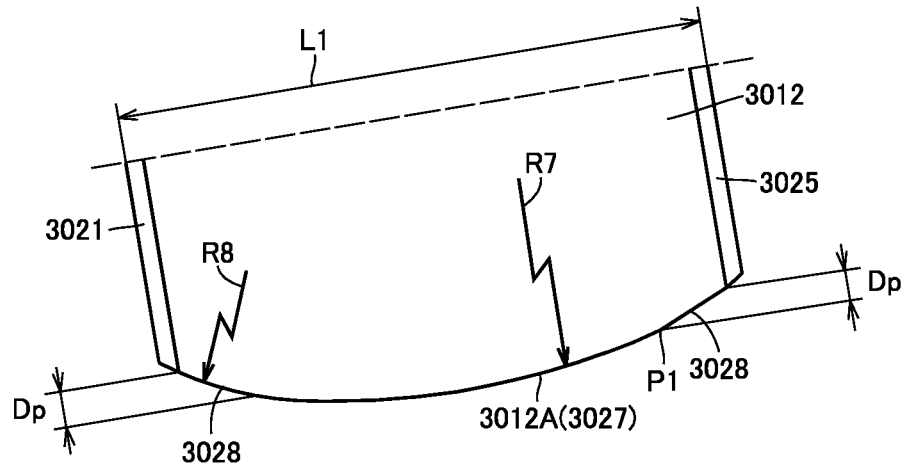
FIG. 31 is a diagram showing a first example of a crowning profile of a tapered roller included in the tapered roller bearing in the present second embodiment.
Figure 32:
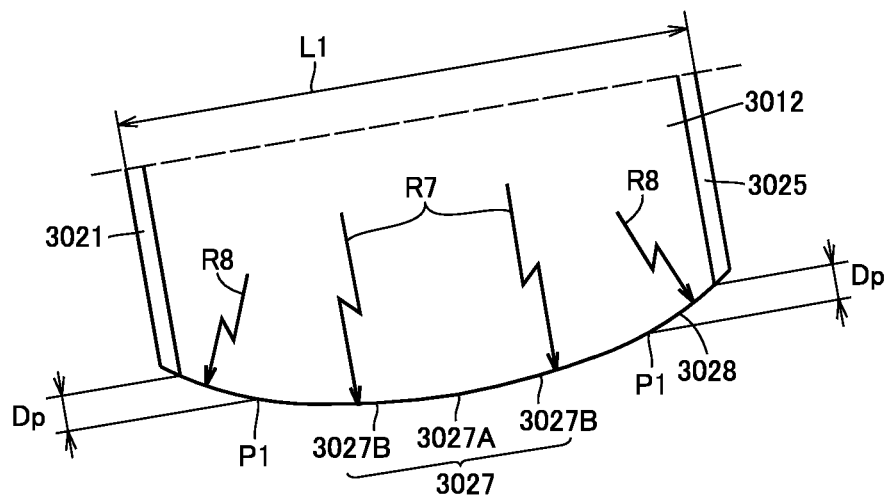
FIG. 32 is a diagram showing a second example of a crowning profile of a tapered roller included in the tapered roller bearing in the present second embodiment.

Rolling surface 3012A of roller 3012 is in a shape, for example, shown in FIGS. 31 and 32. FIG. 31 is a diagram showing a first example of a crowning profile of the tapered roller included in the tapered roller bearing in the present second embodiment. FIG. 32 is a diagram showing a second example of a crowning profile of the tapered roller included in the tapered roller bearing in the present second embodiment. Referring to FIG. 31, contact area crowned portion 3027 and a non-contact area crowned portion 3028 have generatrices extending in the axial direction of the roller expressed by functions different from each other and being smoothly continuous at a connection point P1. In the vicinity of connection point P1, a curvature R8 of the generatrix of non-contact area crowned portion 3028 is set to be smaller than a curvature R7 of the generatrix of contact area crowned portion 3027. "Being smoothly continuous" refers to being continuous without forming a corner and ideally refers to the generatrix of contact area crowned portion 3027 and the generatrix of non-contact area crowned portion 3028 being continuous to have a tangential line in common at a continuous point, that is, such a function that the generatrices can continuously be differentiated at the continuous point.

According to such a construction, a crowned portion is formed in rolling surface 3012A around the outer circumference of roller 3012, so that a grindstone can be applied to rolling surface 3012A in a more necessary and sufficient manner than in formation of a crowned portion only in raceway surface 3013A. Therefore, poor working of rolling surface 3012A can be prevented. Crowned portions 3022 and 3024 formed in rolling surface 3012A can bring about lowering in contact pressure or stress in a contact portion and a longer lifetime of tapered roller bearing 3010. In the vicinity of connection point P1 between contact area crowned portion 3027 and non-contact area crowned portion 3028, curvature R8 of the generatrix of non-contact area crowned portion 3028 is smaller than curvature R7 of the generatrix of contact area crowned portion 3027, so that drops at opposing ends of roller 3012 can be reduced. Therefore, as compared, for example, with an example of a conventional crowning profile of a circular arc, an amount of grinding can be suppressed, efficiency in working of roller 3012 can be improved, and manufacturing cost can be reduced.

The generatrix of contact area crowned portion 3027 is defined by a logarithmic curve of a logarithmic crowning profile expressed in an expression below.

[Expression 7]

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

Contact area crowned portion 3027 expressed by the logarithmic crowning profile can lower a contact pressure or stress in a contact portion so that tapered roller bearing 3010 can have a longer lifetime.

As shown in FIG. 31, one or both of portions on larger and smaller diameter sides of the generatrix of non-contact area crowned portion 3028 may be linear (in the example in FIG. 31, only a portion on the larger diameter side being linear). In this case, drop Dp (see FIG. 31) can further be made smaller than in an example in which the generatrix of non-contact area crowned portion 3028 is arcuate.

One or both of portions on the larger and smaller diameter sides of the generatrix of non-contact area crowned portion 3028 may be arcuate. In this case, drop Dp can be made smaller than in an example in which the generatrix of the entire roller rolling surface is represented, for example, by a logarithmic curve. Accordingly, an amount of grinding can be reduced.

A part or the entirety of the generatrix of contact area crowned portion 3027 may be represented by the logarithmic crowning profile expressed in the expression (1). Owing to contact area crowned portion 3027 represented by the logarithmic crowning profile, a contact pressure or stress in the contact portion can be lowered so that the tapered roller bearing can have a longer lifetime.

As shown, for example, in FIG. 32, the generatrix of contact area crowned portion 3027 may be represented by a straight portion 3027A (identical in meaning to central portion 3023) formed as being flat along the axial direction of the roller and a portion 3027B formed by a logarithmic curve of the logarithmic crowning profile. In this case, only a part of the generatrix of contact area crowned portion 3027 is represented by the logarithmic curve of the logarithmic crowning profile shown in the expression (1). The entire contact area crowned portion 3027 may be represented by portion 3027B formed by the logarithmic curve of the logarithmic crowning profile.

Of the generatrix of non-contact area crowned portion 3028, a portion of connection to portion 3027B defined by a logarithmic curve of the logarithmic crowning profile of contact area crowned portion 3027 is formed preferably to match with a gradient of the logarithmic curve. The generatrix of contact area crowned portion 3027 and the generatrix of non-contact area crowned portion 3028 can thus be continuous further smoothly at the point of connection.

In order to secure working accuracy of a crowning profile, straight portion 3027A which occupies ½ or more of a total length L1 of the roller is desirably provided in the outer circumference of roller 3012. When ½ of total length L1 of the roller is defined as straight portion 3027A and crowned portions in symmetry between a portion on the smaller diameter side and a portion on the larger diameter side with the center in the axial direction of the roller being defined as the reference are assumed, among the design parameters in the expression of the logarithmic crowning profile, $K_2$ is fixed and $K_1$ and $z_m$ are to be designed.

Figure 33:
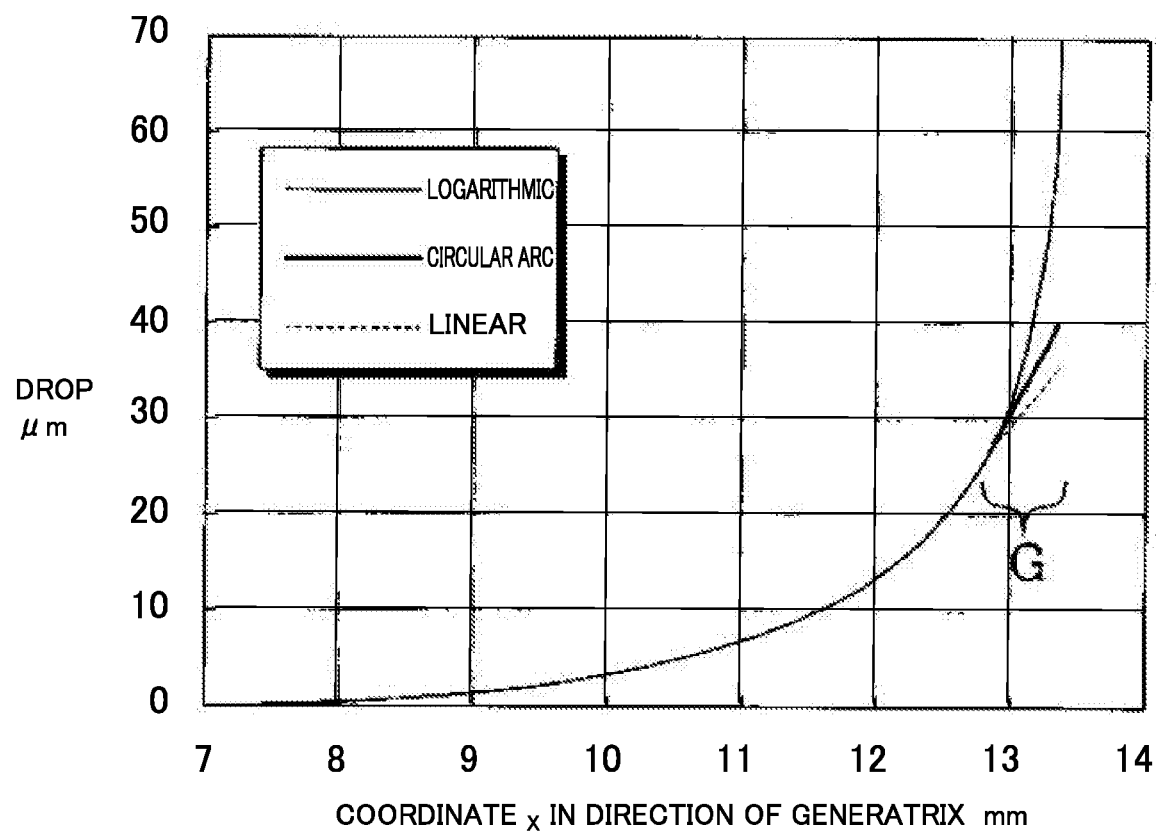
FIG. 33 is a diagram showing relation between a coordinate in a direction of a generatrix and drop of the tapered roller included in the tapered roller bearing in the present second embodiment.

When a crowning profile is optimized by a mathematical optimization approach in connection with $K_1$ and $z_m$ in the expression (1) above, under the present condition, a crowning profile as shown with "logarithmic" in FIG. 33 is obtained. Largest drop of the crowning profile of roller 3012 at this time is 69 μm. FIG. 33 is a diagram showing relation between a coordinate in a direction of a generatrix and drop of the tapered roller included in the tapered roller bearing in the present second embodiment. A region shown with G in FIG. 33 (FIG. 246), however, corresponds to crowned portion 24 facing an undercut 3025A on the larger diameter side and an undercut 3025B on the smaller diameter side of inner ring 3013 in FIG. 33, and it does not come in contact with inner ring 3013. Therefore, region G of roller 3012 does not have to be provided with the logarithmic crowning profile and it may be defined by a straight line, a circular arc, or other functions. Even though region G of roller 3012 is defined by a straight line, a circular arc, or other functions, a contact pressure distribution is identical to that in an example in which roller 3012 is entirely provided with a logarithmic crowning profile, and a function thereof is comparable.

The approach to mathematical optimization of the logarithmic crowning profile will be described.

By appropriately selecting $K_1$ and $z_m$, in a functional expression expressive of the logarithmic crowning profile, the optimum logarithmic crowning profile can be designed.

A crowning profile is generally designed to reduce a maximum value of stress or contact pressure in a contact area. It is assumed that a rolling fatigue life occurs in accordance with von Mises yield criterion and hence $K_1$ and $z_m$ are selected to minimize the maximum value of von Mises equivalent stress.

$K_1$ and $z_m$ can be selected with the use of an appropriate mathematical optimization approach. Though various algorithms have been suggested for the mathematical optimization approach, a direct search method representing one of those algorithms can allow optimization without using a differential coefficient of a function and is useful when an objective function and a variable cannot directly be expressed by a mathematical formula. Optimum values of $K_1$ and $z_m$ are determined by the Rosenbrock method representing one of the direct search methods.

So long as contact between roller 3012 and inner ring 3013 is considered, any crowning profile in region G in FIG. 33 may be applicable. When contact with outer ring 3011 or formability by a grindstone during working is taken into consideration, however, it is not desirable that gradient at point P1 of connection with a logarithmically crowned portion is smaller than a gradient at the logarithmically crowned portion. Since drop will increase when gradient greater than gradient of the logarithmically crowned portion is given to the crowning profile in region G, this is also undesirable. In other words, the crowned profile in region G and the logarithmic crowning profile are desirably designed to smoothly be continuous to each other with their gradients matching with each other at connection point P1. In FIG. 33, a linear crowning profile in region G of roller 3012 is shown with a dotted line and an arcuate crowing profile thereof is shown with a bold solid line. When the crowning profile in region G is linear, drop Dp (see FIGS. 31 and 32) of the crowning profile of roller 3012 is, for example, 36 μm. When the crowning profile in region G is arcuate, drop Dp of the crowning profile of roller 3012 is, for example, 40 μm.

Since other features of the present embodiment are the same as in the first embodiment described previously, detailed description will not be provided.

<Function and Effect of Tapered Roller Bearing>

The present inventors have paid attention to matters below on the tapered roller bearing and derived the construction of the tapered roller bearing described above.

(1) A ratio between a set radius of curvature and an actual radius of curvature after working, of the larger end face of the tapered roller (2) A shape of the raceway surface of the inner ring and the outer ring for suppressing skew of the tapered roller (3) Application of the logarithmic crowning profile to the rolling surface of the tapered roller Characteristic features of the above-described tapered roller bearing will be listed below, although description may partially be redundant.

Tapered roller bearing 3010 according to the present disclosure has a value of ratio $R/R_{BASE}$ between set radius of curvature R and distance $R_{BASE}$ not smaller than 0.75 and not greater than 0.87, with R representing a set radius of curvature of larger end face 3016 of tapered roller 3012 and $R_{BASE}$ representing a distance from point O (see FIG. 26) which is the apex of the cone angle of tapered roller 3012 to larger flange surface 3018 of inner ring 3013. Ratio $R_{process}/R$ between actual radius of curvature $R_{process}$ and set radius of curvature R is not lower than 0.5, where $R_{process}$ represents an actual radius of curvature after grinding of larger end face 3016 of tapered roller 3012 as shown in FIG. 6.

With tapered roller bearing 3010 described above, by setting the value of ratio $R/R_{BASE}$ between set radius of curvature R and distance $R_{BASE}$ as described above, a sufficient oil film thickness in the portion of contact between larger end face 3016 of tapered roller 3012 and larger flange surface 3018 of inner ring 3013 can be ensured, contact between tapered roller 3012 and larger flange surface 3018 and occurrence of wear can be suppressed, and heat generation in the portion of contact can be suppressed.

As shown in FIG. 16, relation between set radius of curvature R and distance $R_{BASE}$ with oil film thickness t is uniquely determined by the Karna expression. With increase in $R_{BASE}$, however, the skew angle of the roller may be larger. Therefore, the numerical range of ratio $R/R_{BASE}$ may be set in consideration of influence by the skew angle.

By setting a difference between the maximum value and the minimum value of arithmetic mean roughness Ra of the annular surface region (projection 3016A) in contact with larger flange surface 3018 in larger end face 3016 of tapered roller 3012 to 0.02 µm Ra or smaller, variation in arithmetic mean roughness Ra of the annular surface region of larger end face 3016 can sufficiently be lessened, and with a synergistic effect of the numerical range of ratio $R/R_{BASE}$ and the numerical range of ratio $R_{process}/R$, a sufficient oil film thickness in the portion of contact can consequently be ensured. Therefore, tapered roller bearing 3010 achieving suppressed heat generation in the portion of contact in a stable manner and improved seizure resistance can be obtained.

Larger flange surface 3018 has arithmetic mean roughness Ra not smaller than 0.1 µm Ra and not greater than 0.2 µm Ra, a roughness profile of larger flange surface 3018 has skewness Rsk not smaller than −1.0 and not greater than −0.3, and the roughness profile of larger flange surface 3018 has kurtosis Rku not smaller than 3.0 and not greater than 5.0. As set forth above, by adjusting arithmetic mean roughness Ra, skewness Rsk of the roughness profile, and kurtosis Rku of the roughness profile of larger flange surface 3018, both of stabilization of rotational torque and seizure resistance of tapered roller bearing 3010 can be achieved.

In tapered roller bearing 3010, preferably, a roughness profile of larger end face 3016 of tapered roller 3012 has skewness Rsk not smaller than 2 and not greater than 7, and the roughness profile of larger end face 3016 has kurtosis Rku not smaller than −1 and not greater than 1. In particular, when kurtosis Rku is smaller than the numerical range, the contact surface between larger end face 3016 of roller 3012 and larger flange surface 3018 of inner ring 3013 is excessively large. In particular, when skewness Rsk is smaller than the numerical range, rotational torque is disadvantageously lower than necessary. In particular, when kurtosis Rku is larger than the numerical range, kurtosis of larger end face 3016 is excessively large. In particular, when skewness Rsk is larger than the numerical range, seizure resistance is disadvantageously poor. Therefore, skewness and kurtosis smaller or greater than the numerical ranges are disadvantageous for formation of an oil film. Therefore, by setting skewness and kurtosis within the numerical ranges, a sufficient oil film thickness in the portion of contact between larger end face 3016 and larger flange surface 3018 can be ensured. Therefore, tapered roller bearing 3010 achieving suppressed heat generation in the portion of contact in a stable manner and improved seizure resistance can be obtained.

When grinding finishing is employed for working larger flange surface 3018 of inner ring 3013 which has roughness characteristics described above, a defined range of roughness is too fine and resistance in working is excessively high. Therefore, such a defect as grinding burn may be caused in larger flange surface 3018 and such working is difficult to perform. Then, in working larger flange surface 3018 of inner ring 3013 with the roughness characteristics above, superfinishing is preferably performed for an ultrashort time period, for example, not shorter than 0.5 second and not longer than two seconds.

Roughness of larger end face 3016 of roller 3012 affects less the function of tapered roller bearing 3010 than roughness of larger flange surface 3018 of inner ring 3013. Therefore, a condition for roughness of larger end face 3016 of roller 3012 is milder than that for larger flange surface 3018. Specifically, from a point of view of obtaining a good wedging effect of lubricating oil, arithmetic mean roughness Ra of larger end face 3016 of roller 3012 should only be not greater than 0.1 µm Ra. Particularly good seizure resistance can be achieved when larger end face 3016 of roller 3012 and larger flange surface 3018 of inner ring 3013 ideally satisfy relation of contact between a spherical surface and a plane. Therefore, when larger flange surface 3018 is in a shape of a generatrix with projections and recesses, a maximum value of a height of the projections and recesses of larger flange surface 3018 is preferably not greater than 1 µm.

In tapered roller bearing 3010, in the cross-section passing through the central axis of inner ring 3013, inner-ring raceway surface 3013A and outer-ring raceway surface 3011A may be linear or arcuate. Rolling surface 3012A of tapered roller 3012 may be crowned. A sum of crown drops may be expressed in the y-z coordinate system with the generatrix of the rolling surface of tapered roller 3012 being defined as the y axis and the direction orthogonal to the generatrix being defined as the z axis by the expression (1) where $K_1$, $K_2$, and $z_m$ represent design parameters, Q represents a load, L represents a length of an effective contact portion of rolling surface 3012A of tapered roller 3012 along the generatrix, E' represents an equivalent elastic modulus, a represents a length from an origin on the generatrix of rolling surface 3012A of tapered roller 3012 to an end of the effective contact portion, and A is defined as A=2$K_1$ Q/πLE'.

[Expression 8]

$$z(y) = A\ln\frac{1}{1-\left\{1-\exp\left(-\frac{z_m}{A}\right)\right\}\left(\frac{y-a}{K_2 a}+1\right)^2} \quad (1)$$

In this case, since rolling surface 3012A of roller 3012 is provided with a crowning profile (what is called a logarithmic crowning profile) having a contour line represented by such a logarithmic function that the expression (1) represents a sum of drops, local increase in contact pressure can be suppressed and wear of rolling surface 3012A of roller 3012 can be suppressed as compared with an example where a conventional crowning profile represented by a partially circular arc is provided.

In the cross-section passing through the central axis of inner ring 3013, inner-ring raceway surface 3013A and outer-ring raceway surface 3011A are linear or arcuate, the central portion of rolling surface 3012A of tapered roller 3012 is formed, for example, as a straight surface, and what is called a logarithmic crowning profile is provided as being continuous to the straight surface. Therefore, a dimension of an area of contact between rolling surface 3012A of tapered roller 3012, and inner-ring raceway surface 3013A and outer-ring raceway surface 3011A (for example, a dimension of a major axis of the contact ellipse) can be long, and consequently skew can be suppressed. Furthermore, variation in position of abutment between inner-ring raceway surface 3013A or outer-ring raceway surface 3011A and rolling surface 3012A can be lessened.

Ratio $R_{process}$/R between actual radius of curvature $R_{process}$ and set radius of curvature R may be equal to or higher than 0.8 in tapered roller bearing 3010. When tapered roller bearing 3010 is used in an extremely severe lubrication environment, a thickness of the oil film in the portion of contact between larger end face 3016 of tapered roller 3012 and larger flange surface 3018 of inner ring 3013 can sufficiently be large by setting ratio $R_{process}$/R to 0.8 or higher.

Results of evaluation for various combinations of arithmetic mean roughness Ra, skewness Rsk of a roughness profile, and kurtosis Rku of the roughness profile, of larger flange surface 3018 of inner ring 3013 according to the test conducted at an increased temperature and the rotational torque test described above are shown in Table 11 to Table 14. In each Table, "AA" indicates being very good, "A" indicates being good, "B" indicates not being good but not being bad, and "C" indicates being bad.

TABLE 11

| Ra (μm) | Rsk | Rku | Seizure Resistance | Torque Stability |
|---|---|---|---|---|
| 0.05 | −3.0 | 6.0 | AA | C |
|  |  | 4.0 |  |  |
|  |  | 2.0 |  |  |
|  | −2.0 | 6.0 | AA | C |
|  |  | 4.0 |  |  |
|  |  | 2.0 |  |  |

TABLE 11-continued

| Ra (μm) | Rsk | Rku | Seizure Resistance | Torque Stability |
|---|---|---|---|---|
|  | −1.0 | 6.0 | AA | C |
|  |  | 4.0 |  |  |
|  |  | 2.0 |  |  |
|  | −0.2 | 6.0 | AA | C |
|  |  | 4.0 |  |  |
|  |  | 2.0 |  |  |
|  | −0.1 | 6.0 | AA | C |
|  |  | 4.0 |  |  |
|  |  | 2.0 |  |  |

TABLE 12

| Ra (μm) | Rsk | Rku | Seizure Resistance | Torque Stability |
|---|---|---|---|---|
| 0.1 | −3.0 | 6.0 | C | A |
|  |  | 4.0 | B | A |
|  |  | 2.0 | B | C |
|  | −2.0 | 6.0 | C | A |
|  |  | 4.0 | B | A |
|  |  | 2.0 | B | C |
|  | −1.0 | 6.0 | C | A |
|  |  | 4.0 | A | A |
|  |  | 2.0 | A | C |
|  | −0.2 | 6.0 | B | A |
|  |  | 4.0 | B | B |
|  |  | 2.0 | A | C |
|  | −0.1 | 6.0 | C | A |
|  |  | 4.0 | C | A |
|  |  | 2.0 | B | C |

TABLE 14

| Ra (μm) | Rsk | Rku | Seizure Resistance | Torque Stability |
|---|---|---|---|---|
| 0.25 | −3.0 | 6.0 | C | AA |
|  |  | 4.0 |  |  |
|  |  | 2.0 |  |  |
|  | −2.0 | 6.0 | C | AA |
|  |  | 4.0 |  |  |
|  |  | 2.0 |  |  |
|  | −1.0 | 6.0 | C | AA |
|  |  | 4.0 |  |  |
|  |  | 2.0 |  |  |
|  | −0.2 | 6.0 | C | AA |
|  |  | 4.0 |  |  |
|  |  | 2.0 |  |  |
|  | −0.1 | 6.0 | C | AA |
|  |  | 4.0 |  |  |
|  |  | 2.0 |  |  |

TABLE 13

| Ra (μm) | Rsk | Rku | Seizure Resistance | Torque Stability |
|---|---|---|---|---|
| 0.2 | −3.0 | 6.0 | C | A |
|  |  | 4.0 | B | A |
|  |  | 2.0 | A | B |
|  | −2.0 | 6.0 | C | A |
|  |  | 4.0 | B | A |
|  |  | 2.0 | A | B |
|  | −1.0 | 6.0 | C | A |
|  |  | 4.0 | A | A |
|  |  | 2.0 | A | B |
|  | −0.2 | 6.0 | B | A |
|  |  | 4.0 | B | B |
|  |  | 2.0 | B | B |

TABLE 13-continued

| Ra (μm) | Rsk | Rku | Seizure Resistance | Torque Stability |
|---|---|---|---|---|
| | −0.1 | 6.0 | C | A |
| | | 4.0 | B | B |
| | | 2.0 | B | B |

A larger flange surface having arithmetic mean roughness Ra of 0.05 μm has a finished surface with a particularly smooth texture as shown in Table 11. Therefore, it can be seen that, regardless of whether or not the larger flange surface has skewness Rsk of the roughness profile in a range not smaller than −1.0 and not greater than −0.3 and regardless of whether or not the larger flange surface has kurtosis Rku of the roughness profile in a range not smaller than 3.0 and not greater than 5.0, particularly satisfactory seizure resistance is obtained whereas torque stability is particularly poor.

As shown in Tables 12 and 13, when a larger flange surface having arithmetic mean roughness Ra of 0.1 m or 0.2 μm is compared with that having arithmetic mean roughness Ra=0.05, the former tends to exhibit poorer seizure resistance and higher torque stability than the latter. It can be seen that, when a larger flange surface has skewness Rsk of the roughness profile satisfying relation of Rsk<−1.0, an oil film is less likely to be formed, which is disadvantageous for seizure resistance. When a larger flange surface has skewness Rsk of the roughness profile satisfying relation of Rsk>−0.3, both of seizure resistance and torque stability cannot be achieved due to trade-off between skewness and characteristics of kurtosis Rku of the roughness profile of the larger flange surface shown below. It can further be seen that, when a larger flange surface has kurtosis Rku of the roughness profile satisfying relation of Rku<3, an oil film is excessively formed, which is disadvantageous for torque stability. It can be seen that, when a larger flange surface has kurtosis Rku of the roughness profile satisfying relation of Rku>5, a surface has excessively sharp small peaks, which are readily in metal-to-metal contact with the larger end face of the roller, and an oil film is less likely to be formed, which is disadvantageous for seizure resistance.

As shown in Table 14, when a larger flange surface having arithmetic mean roughness Ra of 0.25 μm is compared with those shown in Tables 12 and 13, the former exhibits further poorer seizure resistance and higher torque stability than the latter. Specifically, it can be seen that, regardless of whether or not the larger flange surface has skewness Rsk of the roughness profile in the range not smaller than −1.0 and not greater than −0.3 and regardless of whether or not the larger flange surface has kurtosis Rku of the roughness profile in the range not smaller than 3.0 and not greater than 5.0, torque stability is particularly satisfactory whereas seizure resistance is particularly poor.

Thus, it can be seen that a product of the present invention with larger flange surface 3018 having arithmetic mean roughness Ra of 0.1 μm≤Ra≤0.2 μm, skewness Rsk of the roughness profile of −1.0≤Rsk≤−0.3, and kurtosis Rku of the roughness profile of 3.0≤Rku≤5.0 can achieve both of seizure resistance and torque stability.

Since a tapered roller bearing, a method of manufacturing a tapered roller bearing, and an exemplary application of the tapered roller bearing according to the modification of the embodiment of the present invention are the same as in the first embodiment described previously, detailed description will not be provided.

Though the first and second embodiments of the present invention have been described above, the first and second embodiments described above can also variously be modified. The scope of the present invention is not limited to the first and second embodiments described above. The scope of the present invention is defined by the terms of the claims and is intended to include any modifications within the scope and meaning equivalent to the terms of the claims.

Features described in (each example included in) the embodiments described above may be applied as being combined as appropriate within the technically consistent scope. For example, combination of the feature in the second embodiment, that is, the feature that the larger flange surface has arithmetic mean roughness Ra not smaller than 0.1 μm Ra and not greater than 0.2 μm Ra, a roughness profile of the larger flange surface has skewness Rsk not smaller than −1.0 and not greater than −0.3, and the roughness profile of the larger flange surface has kurtosis Rku not smaller than 3.0 and not greater than 5.0 shown in FIGS. 7 to 9, with tapered roller bearing 10 in the first embodiment is also within the scope of application of the present embodiment. Furthermore, each feature described in the second embodiment, for example, the feature that a roughness profile of the larger end face has skewness Rsk not smaller than 2 and not greater than 7 and the roughness profile of the larger end face has kurtosis Rku not smaller than −1 and not greater than 1, or the feature that the maximum value of the height of the projections and recesses in the larger flange surface is not greater than 1 μm, may be combined with tapered roller bearing 10 in the first embodiment. Furthermore, for example, various modifications described in the second embodiment or a more preferred example can also be applied to the first embodiment.

REFERENCE SIGNS LIST 10, 10a, 3010 bearing; 11, 3011 outer ring; 11A, 3011A outer-ring raceway surface; 11B, 12B, 13B, 3012B nitrogen enriched layer; 11C, 12C, 13C unnitrided portion; 12, 3012 tapered roller; 12A, 3012A rolling surface; 12E, 3012E yet-to-be-worked surface; 13, 3013 inner ring; 13A, 3013A inner-ring raceway surface; 14, 3014 cage; 16, 3016 larger end face; 16A, 3016A projection; 16B, 3016B recess; 16C, 21, 3016C, 3021 chamfered portion; 17, 3017 smaller end face; 18, 3018 larger flange surface; 18A flank; 19, 3019 smaller flange surface; 22, 24, 3022, 3024 crowned portion; 22A crowning profile; 23, 3023 straight portion (central portion); 25A, 25B, 3025A, 3025B undercut; 26, 3026 centerline; 27, 3027 contact area crowned portion; 31, 3031 first measurement point; 32, 3032 second measurement point; 33, 3033 third measurement point; 121 differential case; 122 drive pinion; 123 differential gear case; 124 ring gear; 125 pinion gear; 126 side gear

The invention claimed is:
1. A tapered roller bearing comprising:
an outer ring including an outer-ring raceway surface around an inner circumferential surface;
an inner ring arranged on an inner side relative to the outer ring, the inner ring including an inner-ring raceway surface around an outer circumferential surface and a larger flange surface arranged on a larger diameter side relative to the inner-ring raceway surface; and
a plurality of tapered rollers disposed between the outer-ring raceway surface and the inner-ring raceway surface, each tapered roller including a rolling surface in contact with the outer-ring raceway surface and the inner-ring raceway surface and a larger end face in contact with the larger flange surface, at least any one of the outer ring, the inner ring, and the plurality of tapered rollers including a nitrogen enriched layer formed on a surface layer of the outer-ring raceway surface, the inner-ring raceway surface, or the rolling surface, a distance from an outermost surface of the surface layer to a bottom of the nitrogen enriched layer being not shorter than 0.2 mm, a nitrogen concentration in the nitrogen enriched layer being not lower than 0.1 mass % at a position of depth of 0.05 mm from the outermost surface, a difference between a maximum value and a minimum value of arithmetic mean roughness Ra of an annular surface region in contact with the larger flange surface, in the larger end face of the tapered roller, being not greater than 0.02 μm, a value of a ratio $R/R_{BASE}$ being not smaller than 0.75 and not greater than 0.87, where R represents a set radius of curvature of the larger end face of the tapered roller and $R_{BASE}$ represents a distance from an apex of a cone angle of the tapered roller to the larger flange surface of the inner ring, a ratio $R_{process}/R$ being not lower than 0.5, where $R_{process}$ represents an actual radius of curvature after grinding of the larger end face of the tapered roller and R represents the set radius of curvature.

2. The tapered roller bearing according to claim 1, wherein
a grain size number defined under JIS, of a prior austenite crystal grain size in the nitrogen enriched layer is equal to or greater than 10.

3. The tapered roller bearing according to claim 1, wherein
in a cross-section passing through a central axis of the inner ring, the inner-ring raceway surface and the outer-ring raceway surface are linear or arcuate,
the rolling surface of the tapered roller is provided with a crowning profile, and
a sum of drops of crowning profiles is expressed in a y-z coordinate system with a generatrix of the rolling surface of the tapered roller being defined as a y axis and a direction orthogonal to the generatrix being defined as a z axis, in an expression (1)

$$z(y) = A\ln\frac{1}{1-\left\{1-\exp\left(-\frac{z_m}{A}\right)\right\}\left(\frac{y-a}{K_2 a}+1\right)^2} \quad (1)$$

where $K_1$, $K_2$, and $z_m$ represent design parameters, Q represents a load, L represents a length in a direction of the generatrix, of an effective contact portion of the rolling surface in the tapered roller, E' represents an equivalent elastic modulus, a represents a length from an origin on the generatrix of the rolling surface of the tapered roller to an end of the effective contact portion, and A is defined as $A=2K_1Q/\pi LE'$.

4. The tapered roller bearing according to claim 1, wherein
the larger end face of the tapered roller has arithmetic mean roughness Ra not greater than 0.10 μm Ra.

5. The tapered roller bearing according to claim 1, wherein
the larger flange surface has arithmetic mean roughness Ra not smaller than 0.1 μm Ra and not greater than 0.2 μm Ra,
a roughness profile of the larger flange surface has skewness Rsk not smaller than −1.0 and not greater than −0.3, and
the roughness profile of the larger flange surface has kurtosis Rku not smaller than 3.0 and not greater than 5.0.

6. The tapered roller bearing according to claim 5, wherein
a roughness profile of the larger end face of the tapered roller has skewness Rsk not smaller than 2 and not greater than 7, and
the roughness profile of the larger end face has kurtosis Rku not smaller than −1 and not greater than 1.

7. The tapered roller bearing according to claim 5, wherein
a height of projections and recesses in the larger flange surface has a maximum value not greater than 1 μm.

\* \* \* \* \*